US009175954B2

(12) United States Patent
Koerner et al.

(10) Patent No.: US 9,175,954 B2
(45) Date of Patent: Nov. 3, 2015

(54) METHOD AND ARRANGEMENT FOR SHORT COHERENCE HOLOGRAPHY

(75) Inventors: Klaus Koerner, Stuttgart (DE);
Giancarlo Pedrini, Stuttgart (DE);
Christof Pruss, Ostfildern (DE);
Wolfgang Osten, Stuttgart (DE)

(73) Assignee: Universitaet Stuttgart, Stuttgart (DE)

( * ) Notice: Subject to any disclaimer, the term of this patent is extended or adjusted under 35 U.S.C. 154(b) by 0 days.

(21) Appl. No.: 14/110,100

(22) PCT Filed: Dec. 23, 2011

(86) PCT No.: PCT/EP2011/006546
§ 371 (c)(1),
(2), (4) Date: Oct. 4, 2013

(87) PCT Pub. No.: WO2012/136238
PCT Pub. Date: Oct. 11, 2012

(65) Prior Publication Data
US 2014/0022553 A1    Jan. 23, 2014

(30) Foreign Application Priority Data

Apr. 4, 2011   (DE) .......................... 10 2011 016 660

(51) Int. Cl.
*G01B 9/021*   (2006.01)
*G01B 11/02*   (2006.01)
(Continued)

(52) U.S. Cl.
CPC .......... *G01B 11/2441* (2013.01); *G03H 1/0443* (2013.01); *G03H 1/0866* (2013.01);
(Continued)

(58) Field of Classification Search
CPC ..... G03H 1/00; G03H 1/0005; G03H 1/0443; G03H 1/0866; G01B 11/2441; G01B 9/02047; G01B 9/02; G01B 9/021; G01B 11/30; G01B 11/306; G01N 21/453
USPC ................................... 356/458, 457, 513, 514
See application file for complete search history.

(56) References Cited

U.S. PATENT DOCUMENTS

| 6,760,134 | B1 * | 7/2004 | Schilling et al. ................. 359/10 |
| 2001/0045513 | A1 | 11/2001 | Kourogi et al. |
| 2006/0268949 | A1 * | 11/2006 | Gohle et al. .................... 372/21 |

FOREIGN PATENT DOCUMENTS

| EP | 1870030 A1 | 12/2007 |
| WO | 2010090533 A1 | 8/2010 |

OTHER PUBLICATIONS

Bajraszewski, T, et al, "Fourier Domain Optical Coherence Tomography Using Optical Frequency Comb", Jan. 2007, Proceedings of SPIE.

(Continued)

*Primary Examiner* — Tarifur Chowdhury
*Assistant Examiner* — Sunghee Y Gray
(74) *Attorney, Agent, or Firm* — Daniel J. Chalker; Chalker Flores, LLP

(57) ABSTRACT

The invention relates to a method and arrangement for short coherence holography for distance measurement, for profile detection and/or for 3D detection of one or more object elements and/or object areas and/or objects or for readout of holographic volume memories with a holographic interferometer and with at least one short coherence light source. For each optically detected object element in the hologram the holographic interferometer has an optical path difference clearly unequal to zero. At least one spectrally integrally detecting, rastered detector is arranged. The short coherence light source with frequency comb is designed with the optical delay length Y1. Detected holograms are digitally reconstructed. Relative distances of object elements are digitally calculated from the hologram reconstructions, so that a 3D point cloud of object elements and/or object areas and/or objects is produced. Data can be read out optically in parallelized form from holographic volume memories or three-dimensionally structured signatures.

28 Claims, 11 Drawing Sheets

(51) Int. Cl.
*G01B 11/24* (2006.01)
*G03H 1/04* (2006.01)
*G03H 1/08* (2006.01)
*G03H 1/00* (2006.01)

(52) U.S. Cl.
CPC ......... *G02F2203/54* (2013.01); *G02F 2203/56* (2013.01); *G03H 2001/0033* (2013.01); *G03H 2001/045* (2013.01); *G03H 2001/0467* (2013.01); *G03H 2210/62* (2013.01); *G03H 2222/13* (2013.01); *G03H 2222/22* (2013.01); *G03H 2222/23* (2013.01); *G03H 2222/24* (2013.01); *G03H 2222/33* (2013.01)

(56) References Cited

OTHER PUBLICATIONS

Yuan, C., et al., "Lensless Digital Holography with Short-Coherence Light Source for Three-Dimensional Surface Contouring of Reflecting Micro-Object", Sep. 2006, OpticsCommunications.

Chen, H., et al., "Two Dimensional Imaging Through Diffusing Media, Using 150-fs Gated Electronic Holograph Techniques", Jan. 1991, Optics Letters, XP 000179779.

Fu, Yu, et al., "Dual-Wavelength Image-Plane Digital Holography for Dynamic Measurement", Optics and Lasers in Engineering, 47, 2009, 552-557.

Notate, K., et al., "Selective Extraction of a Two-Dimensional Optical Image by Synthesis of the Coherence Function", Optics Letters, 17, 1992, 1, 21.

Korner, K., et al., "Short Temporal Coherence Digital Holography with a femtosecond Frequency Comb Laser for Multi-Level Optical Sectioning", Optics Express, Mar. 26, 2012, XP55023243.

Koukourakis, N., et al., "New Concepts for Depth Resolved Hol9ographic Imaging Based on Spectrally Tunable Diode Lasers", Lasers and Electro-Optics, 2009, XP031521046, 1-7-16-29.

Yu, L., et al., Multi-Wavelength Digital Holographic Tomography Based on Spectral Interferometry, Proceedings of the Spie, Jan. 2009, XP007913131.

Martinez-Leon, L., et al. "Applications of Short-Coherence Digital Holography in Microscopy", Applied Optics, Jul. 2004, vol. 44, No. 19.

International Search Report, PCT/EP2011/006546.

Nomura, T., et al., "Profilometry and Reflectmetry Using Low-Coherent Digital Hol9ography", OSA/BIOMED/DH, 2010, XP55023231.

Del'Haye, P., et al., "Optical Frequency Comb Generation from a Monolithic Microresonator", Nature Letters, vol. 450/20/27, Dec. 2007.

Schwider, J., "Coarse Frequency Comb Interferometry", Proc. of SPIE, vol. 7063, Jan. 2008.

Wagner, C., et al., "Digital Recording and Numerical Reconstruction of Lensless Fourier Holograms in Optical Metrology", Applied Optics, vol. 38, No. 22, Aug. 1999.

\* cited by examiner

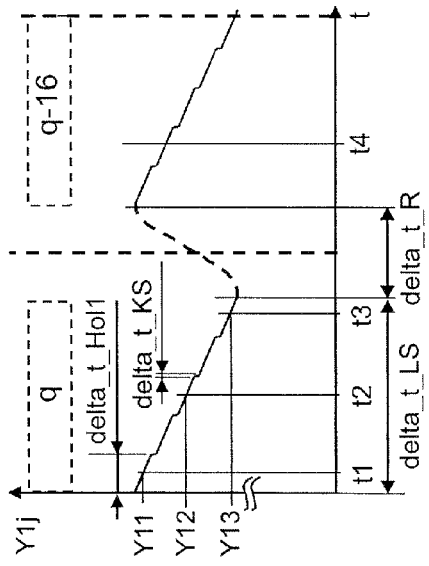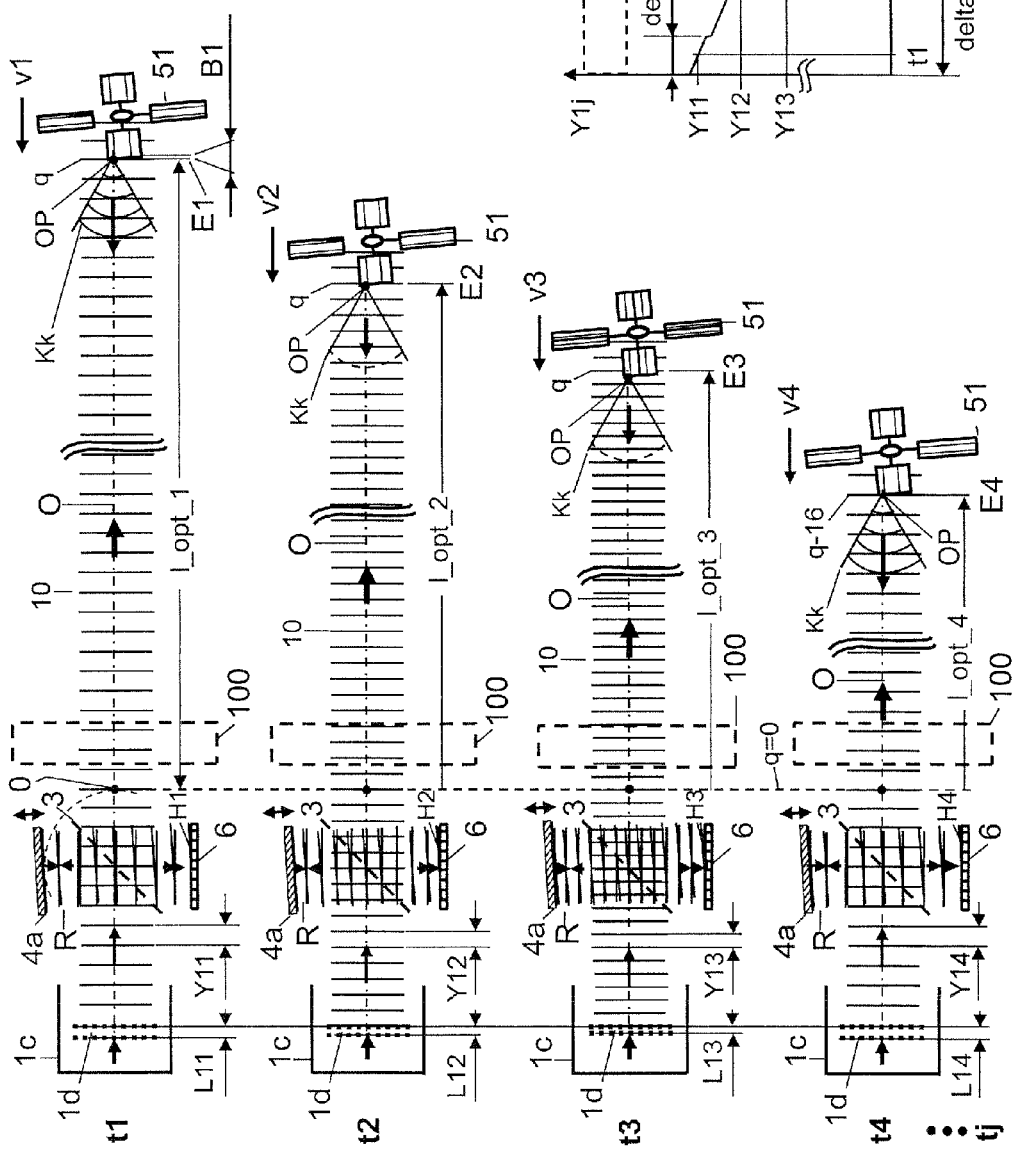
Figure 10
Figure 11

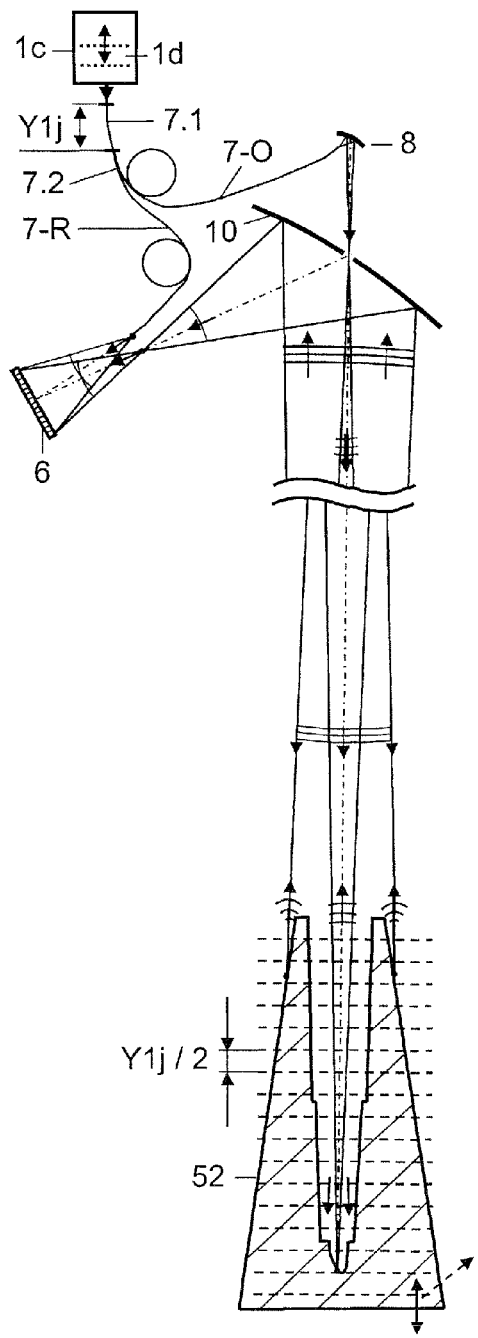
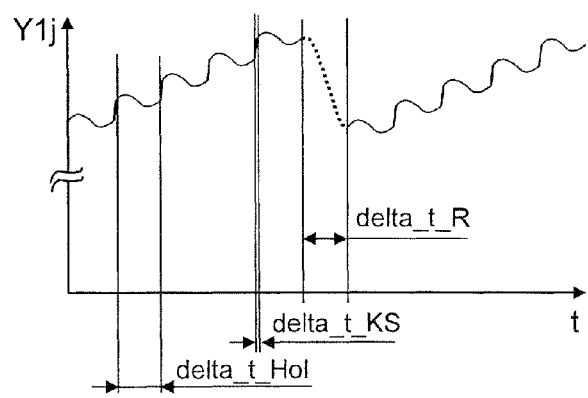
Figure 14
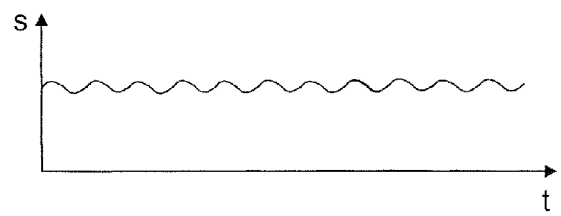
Figure 12
Figure 13

METHOD AND ARRANGEMENT FOR SHORT COHERENCE HOLOGRAPHY

CROSS-REFERENCE TO RELATED APPLICATIONS

This application is a U.S. National Stage Application under 35 U.S.C. §371 of International Application No. PCT/EP2011/006546 filed Dec. 23, 2011, which claims priority to German Patent Application Serial No. 10 2011 016 660.2 filed Apr. 4, 2011.

BACKGROUND

In the determination of an object shape from digitally recorded holograms, Fourier holography, also in multi-wavelength technology, constitutes a good approach to be able to perform the digital reconstruction with comparatively simple algorithms. This was illustrated, among others, in the scientific paper "Digital recording and numerical reconstruction of lensless Fourier-Hologramms in optical metrology" by the authors Christoph Wagner, Sönke Seebacher, Wolfgang Osten, and Werner Jüptner in Applied Optics of Aug. 1, 1999, vol. 38, no. 22, pages 4812 to 4820 [1]. The paper clearly states that Fourier holography can be implemented comparatively well as a holographic method with digital recording, since when the geometry parameters of the holographic arrangement are selected accordingly, the interference fringe densities occurring in the hologram can technically be controlled comparatively well by means of existing digital cameras.

In addition, short-coherence holography constitutes an absolute-measurement measuring method, the potential and advantages of which have been clearly recognized already several years ago, cf. the scientific paper "Applications of short-coherence digital holography in microscopy" by Lluis Martinez-León, Giancarlo Pedrini, and Wolfgang Osten in Applied Optics of Jul. 1, 2005, vol, 44, no. 19, pages 3977 to 3984 [2]. This paper particularly discusses the possibilities and limitations for obtaining a high lateral resolution—as in [1] as well—when determining an object form, while [2] also emphasizes the possibility of depth discrimination particularly for biological objects.

One application of short-coherence holography on the basis of the Fourier approach is shown in the scientific paper [3] "Lensless digital holography with short coherence light source for three-dimensional surface contouring of reflecting micro objects" by Caojin Yuan, Hongchen Zhai, Xiaolei Wang, and Lan Wu in Optics Communications 270 (2007) 176-179. This paper gives an account of a method for digital short-coherence holography according to the Fourier approach for reflecting micro objects with a mechanical depth scan of the object. Here as well, no lenses are used for object imaging and this method also allows optical sectioning, as illustrated in [2]. Here, it is reported that by means of the short-coherence approach particularly the influence of speckling on the reflecting rough object can be reduced. In addition, [3] convincingly illustrates the potential of short-coherence holography in the measurement of rough object surfaces with strong inclination, here for example conical depressions with a large aspect ratio.

As described in [3], in the method for short-coherence holography, only one single area, which—depending on the coherence length of the light source used—is comparatively small in its depth extension, can be addressed holographically. The depth extension of the area is determined by the coherence length of the light used, so that an object with large depth extension and reduced coherence length can only be detected in a comparatively lengthy mechanical object scan with capturing of a plurality of holograms. Thus, when a short-coherent source is applied, it is only possible to holographically detect the object area which in the capturing process in the plane of the hologram detection has an optical path difference smaller than the coherence length of the light forming the hologram.

In a model-like image, this means for the approach according to [3] that an object is scanned in depth with a rung ladder, which only includes one ladder rung and which is gradually shifted in depth to scan the object. In each depth position of the ladder rung, one or more holograms are detected from one or more object points of the object. Therefore, this short-coherence holography method described in [3] can be time-consuming and is thus limited to rather small objects.

Moreover, objects that are further remote, for example at a distance of a few meters, cannot be detected by means of short-coherence holography in the prior art as illustrated in [2] and [3].

BRIEF SUMMARY OF THE INVENTION

It is the object of the invention to be able to measure objects resolved in three spatial dimensions as fast as possible with a resolution that can be adapted over a wide scale. This object is solved by a method and a device with the features indicated in the independent claims. Preferred embodiments are subject of the dependent claims.

For example, in one aspect, the invention provides a method for short-coherence holography of an at least partially light-diffusing object by means of at least one short-coherence light source and/or at least one quasi short-coherence light source, and by means of a holographic interferometer for generating a reference and an object bundle of rays, in which a mean optical path difference Xm different from zero exists, and which, at its output, has a surface-like hologram detection area HDB, in which at least one rasterized detector spectrally integrally detecting at least in spectral sub-ranges is arranged, and which in its surface-like hologram detection area HDB at a point DP of the HDB, for an optically detected object point OP, always has an optical object point-related path difference x_OP_DP different from zero, wherein in the holographic interferometer, short-coherent or quasi short-coherent light having frequency comb characteristic with the frequency interval $\Delta f1 = c/Y1$ in the frequency space is used for hologram formation (c being the speed of light), wherein Y1 represents the delay length of the delay line in the frequency comb generation, and in the capturing process at least one short-coherence hologram is detected by means of a spectrally integrally detecting, rasterized detector, and in which the inequation $$|(x\_OP\_DP - n1 \cdot Y1)| < lc$$

is satisfied for at least one integer n1 with n1=1, 2, 3, and for at least one optically detected, at least partially light-diffusing object point OP_k—and thus a hologram forms in at least one sub-range of the rasterized detector—with lc as the coherence length of the short-coherent or quasi short-coherent frequency comb light, which returns from the light-diffusing object point OP and contributes to hologram formation, and with x_OP_DP as the optical path difference at a point DP of the surface-like hologram detection area HDB for the optically detected, light-diffusing object point OP, and at least one short-coherence hologram is reconstructed digitally, and at least one intensity amplitude of a light-diffusing object point OP from the reconstructed hologram above a threshold value IS is evaluated as a characteristic of the presence of a light-diffusing object point OP of the object space.

In a further aspect, the invention provides a device (arrangement) for short-coherence holography of an at least partially light-diffusing object with at least one short-coherence light source and/or at least one quasi short-coherence light source—light being understood to be electromagnetic radiation from terahertz, via IR, VIS through to UV and EUV radiation, and with a holographic interferometer for generating a reference and an object bundle of rays, in which a mean optical path difference Xm different from zero exists, and which, at its output, has a surface-like hologram detection area HDB, in which at least one rasterized detector spectrally integrally detecting at least in spectral sub-ranges is arranged, and which in its surface-like hologram detection area HDB at a point DP of the HDB, for an optically detected object point OP, always has an optical object point-related path difference x_OP_DP that is clearly different from zero, wherein at least one short-coherent light source and/or at least one quasi short-coherent light source having frequency comb characteristic is formed and assigned to the holographic interferometer.

In a preferred aspect, the device preferably comprises an evaluating module adapted to evaluate at least one short-coherence hologram in the capturing process by means of a spectrally integrally detecting, rasterized detector, wherein the inequation $$|(x\_OP\_DP - n1 \cdot Y1)| < lc$$

is satisfied for at least one integer n1 with n1=1, 2, 3, ..., and for at least one optically detected, at least partially light-diffusing object point OP_k—and thus a hologram forms in at least one sub-range of the rasterized detector—with lc as the coherence length of the short-coherent or quasi short-coherent frequency comb light, which returns from the light-diffusing object point OP and contributes to hologram formation, and with x_OP_DP as the optical path difference at a point DP of the surface-like hologram detection area HDB for the optically detected, light-diffusing object point OP, and at least one short-coherence hologram is reconstructed digitally, and at least one intensity amplitude of a light-diffusing object point OP from the reconstructed hologram above a threshold value IS is evaluated as a characteristic of the presence of a light-diffusing object point OP of the object space. The device is particularly adapted to perform a method according to the invention, particularly according to one of the preferred embodiments described herein.

Thereby, the invention specifically has the effect that measuring systems for distance or interval measurement or for obtaining 3D point clouds with a resolution that can be adapted over a wide scale, as required, and thus usually also a measuring or scanning accuracy that can be adapted over a wide scale are made available for commercial use.

The inventive approach includes the possibility of a depth resolution from the sub-micrometer to the centimeter range depending on the object distance and the object extension and the design of the components used, and can thus be applied over a wide scale.

BRIEF DESCRIPTION OF THE FIGURES

For a more complete understanding of the features and advantages of the present invention, reference is now made to the detailed description of the invention along with the accompanying figures and in which:

FIG. 10 relates to the detection of space debris by means of a holographic arrangement;

FIG. 11 illustrates the relations for the delay lengths (spatial pulse intervals) Y1j with respect to time;

FIG. 12 relates to the detection of a light-diffusing object made of a metallic material by means of a holographic arrangement;

FIG. 13 shows the mechanical vibration of the object in form of the vibration path s; and FIG. 14 shows the optical path length Y1j for compensating for this vibration over time, which is generated by control using the information about the respective current deflection of the object in measurement real time.

DETAILED DESCRIPTION OF THE INVENTION

Figure 1:
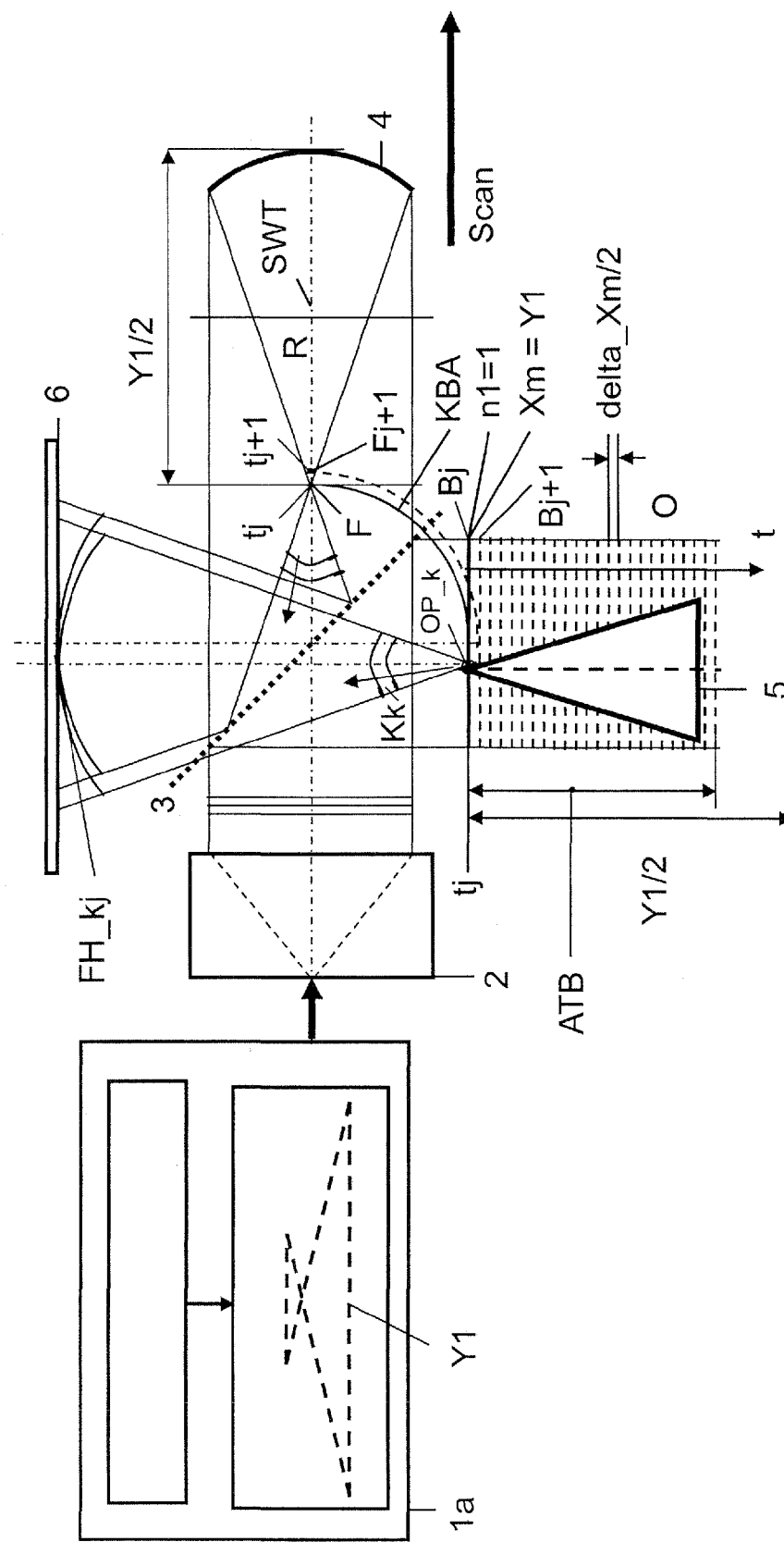
FIG. 1 relates to the detection by means of a holographic arrangement.

The invention particularly has the effect that it allows a comparatively high resolution in all three spatial coordinates in optical sampling by means of short-coherence holography also in the case of large object distances compared to the achievable depth resolution. In the end, however, the aperture angle received by a light-diffusing object point, i.e. the detected section of the spherical wave coming from an object point, is decisive for the achievable resolution.

In the optical detection by means of short-coherence holography, in one aspect, preferably neither the object nor the holographic arrangement are to be moved as a whole. This is particularly advantageous in optical 3D sampling of large components in the event of an accident in power plants. A further aspect, in which moved objects are inspected, by contrast, will be described at a later point. The present invention can be used efficiently for this purpose as well.

In particular, the invention has the effect that objects can be optically measured comparatively fast.

In particular, the invention allows obtaining depth information from the depth of the object space by means of short-coherence holography. Here, the depth resolution can be adapted in a very flexible way.

It is a particular advantage that information about an at least partially light-diffusing object can be obtained simultaneously from different depths of the object space. The captured short-coherence holograms, which are formed by spherical waves from different depths of the object space at the same time, can be processed to form a 3D point cloud by means of digitally performed hologram reconstruction. This has the advantage that by parallelized, i.e. simultaneous sampling of object areas at different depths, a clearly higher measuring productivity can be achieved compared to the prior art with short-coherence holography.

To argue with a model-like image, this means that the present invention offers the advantage of scanning an object with a rung ladder that has several ladder rungs, which are gradually shifted over the object in depth and thus scan this object optically, so that information in form of short-coherence holograms can be obtained simultaneously from several depth ranges of the object, i.e. from the depth ranges that are being traversed optically by a ladder rung area.

A further special advantage is that both the absolute detection of the object position and the determination of the object shape—even at greater distances, for example at an object distance of 10—meters are possible with a comparatively high resolution in the three spatial coordinates.

In particular, with respect to the term path difference as used herein, a sign is not of importance. Therefore, in all inequations for an optical path difference used in this specification—irrespective of the position of an object or object point—always a positive numerical value is to be assumed and inserted. The use of an always positive value also applies unconditionally to the delay length Y1. Specifically, the difference in the optical path length between a reference bundle of rays and an object bundle of rays can be selected to be different depending on the application. For example, while for applications with distant objects (in particular moving objects) preferably a path difference is selected in which the optical path length of the object ray is larger than the optical path length of the reference ray, these relations may be desired exactly the other way round in examinations on a microscopic scale, i.e. it may be desired in this case to select the optical path length in the reference ray to be larger than in the object ray.

Thus, the invention particularly provides a method for short-coherence holography specifically for a technical or biological, at least partially light-diffusing object or for at least partially light-diffusing object elements for obtaining a 2D or 3D point cloud in the microscopic, mesoscopic, specifically also the in-vivo 3D detection of the shape of a tooth or several teeth in the mouth of a person, or on the macroscopic scale, or for endoscopic 2D or 3D metrology of technical or biological, at least partially light-diffusing objects accompanied by obtaining a 2D or 3D point cloud, or also only for distance measurement or depth determination of an at least partially light-diffusing object.

The method is performed with a holographic interferometer for generating reference and object light—light being understood to be electromagnetic radiation from terahertz, via IR, VIS, UV through to EUV radiation.

A surface-like hologram detection area HDB is located at the output of the holographic interferometer. Moreover, at least one short-coherence light source or at least one quasi short-coherence light source is arranged for illumination purposes. In the holographic interferometer, there is an optical path difference X_k for the detected object points OP_k, which is always clearly different from zero, wherein the holographic interferometer, in its surface-like hologram detection area HDB at a point DP of the hologram detection area HDB, for an optically detected object point OP, always has an optical object point-related path difference x_OP_k_DP that is clearly different from zero. At least one rasterized detector spectrally integrally detecting at least in spectral sub-ranges is arranged in this hologram detection area HDB.

According to the invention, the short-coherence holography is procedurally combined with the frequency comb technology to form the short-coherence frequency comb holography SCFC holography by using, in the holographic interferometer, short-coherent or quasi short-coherent light having frequency comb characteristic with the frequency interval $\Delta f1=c/Y1$ in the frequency space for hologram formation, wherein Y1 represents the delay length of the delay line in the frequency comb generation, and in the capturing process at least one short-coherence hologram is detected by means of a spectrally integrally detecting, rasterized detector. Preferably, several delay lines can be arranged for frequency comb generation.

The inequation $$|(x\_OP\_k\_DP - n1 \cdot Y1)| < lc$$

is satisfied for at least one integer n1 with n1=1, 2, 3, ..., and for at least one optically detected, at least partially light-diffusing object point OP_k, and thus a hologram forms in at least one sub-range of the rasterized detector, with lc as the coherence length of the short-coherent or quasi short-coherent frequency comb light, which returns from the light-diffusing object point OP and contributes to hologram formation. x_OP_k_DP is the optical path difference at a point DP of the surface-like hologram detection area HDB for the optically detected, light-diffusing object point OP_k. At least one short-coherence hologram is reconstructed digitally, and at least one intensity amplitude of a light-diffusing object point OP_k is determined from the reconstructed hologram above a threshold value IS. This is the criterion for the presence of a light-diffusing object point OP_k of the object space, so that by means of digital hologram reconstruction and using the threshold criterion IS, it is possible to determine a plurality of light-diffusing object points in the object space and thus a 3D point cloud.

The short-coherence light source can preferably have a coherence length lc from the one-digit micrometer range to the one-digit millimeter range. A quasi short-coherence light source can preferably have a coherence length lc from the one-digit millimeter range to the one or two-digit centimeter range.

This allows scanning also objects that are very far away, e.g. in a damaged power plant, since for an integer n1, the inequation (1) can be satisfied when the mean optical path difference Xm in the holographic arrangement is set accordingly, e.g. also by means of a shiftable reference reflector. Here, the coherence length lc of the short-coherent light can be made comparatively large, for example within a one-digit millimeter range, if it is only and solely desired to test or detect the presence of an object point or an object at a greater distance, for example the presence of power cables or also fine wires in a very unclear and unpredictable situation in which the depth information is very profitable compared to high-resolution image recording. In this case, it is not even necessary, if e.g. the delay length Y1 is only several millimeters in the generation of frequency comb light, to know the integer n1 in inequation (1). The integer n1 describes the integer number of delay lengths Y1 that fit into the optical path difference and x_OP_kDP, i.e. is derived from a quotient. It is often sufficient to know the number n1 approximately so as to be able to assign the captured and reconstructed data. In the shape measurement of flat objects, it is rather unimportant to know the number n1 if the profile depth is clearly smaller than the delay length Y1. In order to be able to adapt the coherence length lc to the measurement situation, it is possible to use preferably spectrally controllable filters.

Another field of application can be the detection of the integrity of comparatively flat seals on containers with highly radioactive content. In this case, it is rather unimportant to know n1, where n1 is the number, rounded to an integer, of delay lengths Y1, which fits into the optical path difference of the holographic arrangement. Here, an invariable n1 for all scanned object points is assumed as a rule, since the object is a flat object—in relation to the existing delay length Y1 in the generation of frequency comb light.

However, if a-priori information about an object with ruled geometry exist, for example about an at least partially rotationally symmetric cone with a large aspect ratio and with its axis of symmetry arranged at least approximately parallel to the propagation direction of the frequency comb light, information about its 3D shape, also deviations from its target shape, can be determined by means of the method according to the invention. In this case and when a Michelson interferometer as a holographic arrangement is applied, parallel areas form in the object space in the form or parallelly arranged ladder rungs—as in a narrow rung ladder—when the object is illuminated with frequency comb light with at least approximately planar wavefronts. Here, the individual ladder rungs are parallel to the wavefronts in the object illumination. Thus, planar wavefronts are assumed. In the model, the center of the topmost ladder rung, which is to represent the case n1=0, defines the optical path difference of zero in the holographic interferometer. In this case, a frequency comb light source is redundant though, as it does not offer any clear advantage. The exact location of this special (zeroth) ladder rung of course depends on the position and formation of the reference reflector in the reference arm of the here-assumed Michelson interferometer. A shift of the reference reflector also shifts the position of this zeroth rung with the rung ordinal number zero as assigned by definition.

This image of the rung ladder illustrates the situation quite clearly here if one takes a look at the centroid ray of the spatially highly coherent illumination bundle of rays propagating toward the object, which in this case is assumed to be a parallel bundle, and the rather narrow rung ladder in the model for illustration purposes is to be located only in the direct vicinity of the centroid ray of the illumination bundle of rays. In a wave-optical consideration, the ladder rungs are parallel to the wavefronts of the spatially highly coherent light for object illumination.

The light returning from an object point OP_k, which in the model is to be located on the centroid ray of the illumination bundle of rays, is to propagate as a ray parallel to the above-described centroid ray in the model as well. In this case, the ladder model approximates the situation with the optical path lengths quite well if the associated reference beam at the output of the Michelson interferometer coincides with the object ray returning from OP_k. It is clear that a spherical wave propagates from the light-diffusing object point OP_k and interference with the reference light takes place in the hologram detection plane. This reference light can preferably be formed as a spherical wave as well, the center of the reference spherical wave exemplarily being on the centroid ray of the bundle of rays propagating in the reference arm, so that here the case of Fourier holography is given. In the surface-like hologram detection area HDB, interference of two spherical waves occurs.

The ladder model approximates the relations particularly well if the reference wave is a spherical wave with its source point optically conjugated to the object point OP_k, wherein the latter—here in the model—is to be located on the centroid ray of the bundle of rays in the reference arm. In this case, the change of the optical path difference in the hologram approaches zero in the entire hologram detection area HDB.

Illustration of the reference wave as a spherical wave with the spherical wave source point optically conjugated to the object point OP_k can take place by means of a correspondingly arranged paraboloid of revolution in the reference arm of a Michelson interferometer for performing the holography. Here—in the model—the focus of the paraboloid of revolution is on the centroid ray of the incoming bundle of rays, and the centroid ray coincides with the axis of symmetry of the paraboloid of revolution.

In the model in the object space, the individual rungs of this rung ladder exhibit—with their center lines—half the distance of the delay length Y1, i.e. Y1/2, of the frequency comb light source from each other. The ladder rungs can be numbered up to the ordinal number n1_max. The thickness of these ladder rungs, i.e. their depth extension—here in the propagation direction of light—is at least approximately equal to half the coherence length kc of the frequency comb light, i.e. lc/2, in the model.

The coherence length lc is preferably adjustable within wide limits, whereby the thickness of these model-like ladder rungs is also variable within wide limits. The smaller the coherence length lc, i.e. the thinner the ladder rungs in the model, the higher the achievable depth resolution tends to be, since in this way the discrimination of object points becomes stricter. This is because only the areas on the object in which a ladder rung area intersects the object—in the consideration again a rotationally symmetric cone—can form holograms in the surface-like hologram detection area HDB anyway. Thus, a rotationally symmetric cone can be scanned holographically in some, rather thin areas, and due to the a-priori information about the object shape due to the ruled geometry, the depth values determined from individual holograms by reconstruction of the intensity amplitude—as a rule rather consistently—can be combined to form a 3D point cloud. In the simplest case, it is only determined whether an intensity amplitude above a threshold technically useful to the skilled person can be reconstructed from the hologram anyway. This is the simplest criterion. In the simplest case, the depth position of a thus determined object point OP_k is assigned to the center of the respective ladder rung, which can involve a considerable error that may be in the order of half the coherence length. In this way, it is clear that the use of short-coherent light with a rather small coherence length lc tends to be accompanied by less sampling uncertainty in the determination of the depth position of a thus determined object point OP_k.

When it comes to performing a comparatively high-resolution shape measurement of an object, for example the in-vivo shape detection of a tooth in the mouth of a person, the coherence length lc of the short-coherent light can preferably and advantageously be in the two-digit micrometer range.

In the high-resolution detection of the microprofile of a comparatively small object area, the coherence length lc of the short-coherent light can even be in the one-digit micrometer range, i.e. the short-coherent light can be "white" in the visible spectral range.

The rasterized detector can be formed as a monochrome matrix CCD or matrix CMOS camera or as a color matrix CCD or color CMOS camera, in a single-chip or multi-chip arrangement. Preferably, several camera chips or a plurality of camera chips in matrix form are arranged. The rasterized detector can preferably be formed by a plurality of camera chips in matrix form, wherein preferably the arrangement of several chip matrices is possible as well, for example one chip matrix for a specific spectral range.

In the method for short-coherence holography, preferably a plurality of holograms, in the form of a hologram stack, is gradually formed and captured by means of a rasterized detector. In the capturing process or between the capture of individual short-coherence holograms, a gradual change of
either the mean optical path difference Xm in the holographic interferometer in the reference arm and/or in the object arm
or/and the delay length Y1 of the delay line for frequency comb generation
is performed until for at least one light-diffusing object point OP_k of the object space in an area at the point DP in the hologram detection area HOB for frequency light, which originates at at least one light source with the optical delay length Y1, the inequation (1) is satisfied for at least one integer n1 with n1=1, 2, 3, . . . .

$$|(x\_OP\_k\_DP - n1 \cdot Y1)| < lc \qquad (1)$$

In this way, at least one hologram is formed—with lc as the coherence length of the hologram-forming frequency comb light, which returns from at least one light-diffusing object point OP_k. x_OP_k_DP is the optical path difference at a point DP of the surface-like hologram detection area HDB for an optically detected object point OP_k. It is a technical advantage to preferably change the mean optical path difference Xm in the holographic interferometer in the reference arm. This can be achieved by shifting an end reflector in the reference arm.

The captured short-coherence holograms are reconstructed digitally, and at least one intensity amplitude of a light-diffusing object point OP_k from at least one reconstructed hologram above a threshold value IS is evaluated as a characteristic of the presence of a light-diffusing object point OP_k of the object space, so that by means of digital hologram reconstruction and using the threshold criterion IS, it is possible to determine a plurality of light-diffusing object points OP_k, with k=2, 3, 4, . . . in the object space and thus a 3D point cloud.

Due to the predetermined and also measured multiple change of the mean optical path difference Xm, the skilled person is easily able to collect data from recorded holograms in order to exactly determine the integer number n1. To this end, several inequations according to the inequation (1) are set up, the object position being unchanged but the mean optical path difference Xm being varied.

If a rotationally symmetric cone is to be scanned holographically in its height extension by a plurality of thin areas, which each provide holograms, continuously over time, preferably the mean optical path difference Xm must be changed step by step of continuously, at least one hologram being recorded after each step. If phase-shift technology is applied, preferably three, four, or five—optionally even more—mutually phase-shifted holograms are recorded after each step.

Here, the change of the mean optical path difference Xm in each step can preferably be a tenth of the coherence length lc of the hologram-forming frequency comb light, so that an overlap of the "rung area" forms gradually on the object in the depth direction. Thus, for an object point OP_k in the digitally reconstructed holograms, several intensity amplitude values result, which can be located on a Gaussian curve, whereby the skilled person is easily able to perform the well-known centroid evaluation for each object point OP_k, which usually improves the measurement uncertainty (accuracy) in depth measurement significantly.

With the approach according to the invention, it is also possible to read out holographic volume memories. With this approach, it is also possible to capture three-dimensional microscopic signatures in one shot.

Preferably, it is also possible to change the delay length Y1 of the delay line, which is considered to be technically more complex though—compared to changing the mean optical path difference Xm in the holographic arrangement, for example in the reference arm of the holographic interferometer by shifting an end reflector.

Particularly in the case of comparatively large object distances and a comparatively short delay length Y1 of a frequency comb light source of whatever kind, high demands are placed on the quality of the frequency comb. Therefore, the frequency combs must have very sharp "needles" and equidistant needles, i.e. small full width at half maximum with respect to the frequency interval of the individual maxima (frequency comb needles). This requirement increases with the quotient of mean optical path difference Xm and delay length Y1 of a frequency comb light source of whatever kind. In the prior art and to the best of one's knowledge, this is best achieved for near range objects to be sampled, where the above-mentioned quotient is comparatively small. The rounded integer part of this quotient represents the above-described number n1, with n1=1, 2, 3, . . . 50, . . . The number n1 can also be determined by multiple change of Xm from a hologram stack.

With the approach according to the invention, it is also possible to read out or recognize holographic volume memories or a three-dimensional signature in a parallelized form, i.e. at the same time, in strongly differing depths of the volume by means of hologram formation.

Here, preferably the mean optical path difference Xm is changed gradually and different depth ranges in the storage volume are addressed, and thus dots in the volume of the holographic memory or a three-dimensional signature, which carry the digital information, are recognized as present (L situation) or not present (0 situation).

Preferably, in the method for short-coherence holography, a plurality of holograms j, in form of a hologram stack, is formed gradually in j situations and is captured by means of a rasterized detector. In the capturing process or between the capture of individual short-coherence holograms j, a gradual change of
either the mean optical path difference Xm in the holographic interferometer in the reference arm and/or in the object arm
or/and the delay length Y1 of the delay line for frequency comb generation
is performed until for at least one light-diffusing object point OP_k of the object space in an area at the point DP in the hologram detection area HDB for frequency light, which originates at a light source with the optical delay length Y1 or Y1_j, at least one of the two inequations (2) and (3) is satisfied for at least one integer n1 with n1=1, 2, 3, . . . .

$$|(x\_OP\_k\_j\_DP\_j - n1 \cdot Y1)| < lc \quad (2)$$

$$|(x\_OP\_k\_DP - n1 \cdot Y1\_j)| < lc \quad (3)$$

and thus at least one hologram is formed.

The, here, first inequation (2) describes the case of changing the mean optical path difference Xm in the holographic interferometer in j steps, and the, here, second inequation (3) describes the case of changing the delay length Y1 of the delay line for frequency comb generation in the holographic interferometer in j steps.

Here, lc is the coherence length of the hologram-forming frequency comb light, which returns from at least one light-diffusing object point OP_k. x_OP_k_j_DP_j and x_OP_k_DP are the optical path difference at a point DP of the surface-like hologram detection area HDB for an optically detected object point OP_k and a situation j. The value x_OP_k_j_DP_j is to be assumed if the mean optical path difference is varied in a predetermined manner. In contrast, the value x_OP_k_DP is to be assumed if the optical delay length Y1 of the delay line for frequency comb generation is changed. Y1 or Y1_j the latter in the case of a change of the delay length—represent the respective optical delay length of the frequency comb light source.

The recorded short-coherence holograms with the number j are reconstructed digitally, and at least one intensity amplitude of a light-diffusing object point OP_k from at least one reconstructed hologram j above a threshold value IS is evaluated as a characteristic of the presence of a light-diffusing object point OP of the object space, so that by means of digital hologram reconstruction and using the threshold criterion IS, it is possible to determine a plurality of spatially distributed light-diffusing object points OP_k, with k=2, 3, 4, . . . in the object space and thus a 3D point cloud.

Preferably, in the method for short-coherence holography, it is also possible to perform a generation and detection of holograms with the number j1 in a first phase for an addressed object depth range of the object space with light-diffusing object points OP_k for a first short-coherent or quasi short-coherent light having frequency comb characteristic with the frequency interval $\Delta f1 = c/Y1$ for an integer n1, with n1=1, 2, 3, . . . in a time domain $\Delta t1$, and, in the capturing process or between the capture of individual short-coherence holograms, to gradually change the mean optical path difference Xm in the holographic interferometer
in the reference arm
or/and in the object arm.

This is followed by switching off, deflecting, or blocking out the first light having frequency comb characteristic.

Preferably, a generation and detection of holograms with the number j2 is performed in a second phase in a time domain $\Delta f2$ for the same object depth range of the object space with the same light-diffusing object points OPj for a second short-coherent or quasi short-coherent light having frequency comb characteristic with the frequency interval $\Delta f2 = c/Y2$, and, in the capturing process or between the capture of individual short-coherence holograms, a gradual change of the mean optical path difference Xm in the holographic interferometer
in the reference arm
or/and in the object arm
is performed in the same way as in the time domain $\Delta t1$.

Here, either only the source 1 or only the source 2, or also even only a single further source i is switched on. In this way, it is possible to obtain a large uniqueness range in the depth detection of objects by means of multi-order or multi-level short-coherence frequency comb holography.

By analogy with the above, methods with more than two short-coherent light sources having frequency comb characteristic i.e.—in more than two time windows—are possible as well. For example, it is also possible to obtain an absolute reference point in the object space by certain analogy with the multi-wavelength technology of interferometry by means of more than two sources of short-coherent light have frequency comb characteristic at different times.

The image of the rung ladder illustrates the situation quite clearly in that, in a first phase, the individual ladder rungs of a rung ladder (with their center lines) exhibit half the distance of the delay length Y1, i.e. Y1/2, of the frequency comb light source from each other, and in a second phase exhibit half the distance of the delay length Y2, i.e. Y2/2, of the frequency comb light source from each other. In each of the two phases, in the model, the ladder rung is shifted in depth in equal steps clearly below the coherence length lc of the frequency comb light for hologram formation. This is to be performed downward here in the model—in each of the two phases starting in the same initial position (0 position). Depending on the depth location of a considered object point OP_k, a point generally answers in the two phases in form of a hologram in different step positions j of the ladder assumed here in the model. From this, the skilled person—e.g. also by analogy with the ladder model used in two-wavelength technology—can surely determine the depth position within a beat range Ys, which is given here by the two frequency comb light sources with the respective delay lengths Y1 and Y2 and due to their difference delta_Y. The unique assignment of an object point OP_k, which "responded two times—i.e. in phase 1 and in phase 2—optically in form of a hologram", is a task the competent skilled person can easily solve.

Here, the model case is to be considered where half the delay length Y1/2 is exactly 1 unit of length and half the delay length Y2/2 is exactly 10/9 units of length. Then half the beat period Ys/2 is exactly 10 units of length. Thus, for an object point OP_k in phase 1 (light source 1 is switched on), the fraction in half the delay length Y1/2 results from the number of step positions j1 until the intensity for the object point OP_k from the hologram is above the threshold IS. For example in this case for the step position j1=2. Subsequently in phase 2, the second frequency comb light source with the delay length Y2 is put into operation and the same object point OP_k "reports" at/after hologram reconstruction now already at the start position, i.e. at j2=0 with an intensity from the reconstructed hologram above the threshold IS. Then the difference (j1–j2) yields the number 2 and thus also the information that the "responding" object point OP_k is located at the depth 2.2 units of length—with respect to half the delay length Y1/2—when viewed from the zero position. This "fraction method", illustrated here in a simplified form, is well known to experts from two-wavelength technology or generally from two-period technology.

It is to be made clear again that this is not a beat approach that is based on an interaction or interference of electromagnetic waves. The beat approach is based on measurement information that is based on the calculation of stretched or compressed reference lengths, here the delay lengths Y1 and Y2 as well as preferably further delay lengths Yi.

Preferably, in the method for short-coherence holography, it is also possible to perform a generation and detection of holograms with the number j1 for an addressed object depth range of the object space with light-diffusing object points OP_k for a first short-coherent or quasi short-coherent light having frequency comb characteristic with the frequency interval $\Delta f1=c/Y1$ in a spectral range delta_sigma1, and, in the capturing process or between the capture of individual short-coherence holograms, to gradually change the mean optical path difference Xm in the holographic interferometer in the reference arm or/and in the object arm.

Preferably, at the same time, a generation and detection of holograms with the number j2 is performed for at least one second short-coherent or quasi short-coherent light having frequency comb characteristic with the frequency interval $\Delta f2=c/Y2$ in a spectral range delta_sigma2, which is completely separate from the spectral range delta_sigma1, for the same object depth range of the object space with the same light-diffusing object points OP_k.

Thereby, a simultaneous, concurrent measurement in several spectral ranges, preferably with a multi-chip color camera, is possible, so that a simultaneous multi-order or multi-level short-coherence frequency comb holography can be performed.

By analogy with the above, methods with more than two frequency comb light sources in more than two spectral windows are possible as well. Thus, it is also possible to obtain an absolute reference point in the object space with more than two frequency comb light sources.

Preferably, in the method for short-coherence holography, it is also possible to apply the Fourier holography. This reduces the demands on the rasterized detectors and the reconstruction effort significantly. Preferably, in the Fourier holography with reference spherical wave, a predetermined positioning of the reference spherical wave source point is performed, so that the reference spherical wave source point is localized as closely as possible in the surrounding of the object points to be measured, wherein here the optical conjugation of reference space and object space applies. Thus, for example, the reference spherical wave source point is positioned by precisely shifting object components, such as roof prism mirror, triple mirror, or also curved single-mirror or mirror systems, such that the reference spherical wave source point coincides with an object point of great interest, for example an object point in the immediate vicinity of a real or assumed crack in a container, a trough, or a tank.

It should be noted that it is preferably also possible, largely independent of the special formation of the holographic arrangement, in addition to the shape determination with this holographic arrangement, to perform a holographic deformation measurement with this holographic arrangement or with optical component of the same in order to obtain further information about a defect component. To this end, light of further laser light sources, such as double pulse laser, can be coupled in to be able to also perform a shape deviation or vibration analysis at almost the same time as the 3D shape detection. This is particularly beneficial to the recognition of cracks in containers. Here, it is also possible to use further cameras, such as high-speed cameras, or to exchange, remove, or add optical components.

Preferably, means allowing a predetermined movement of optical components, such as roof prism mirror, triple mirror, or also curved mirror components, are arranged here as well. Preferably, means for measuring this movement of components are arranged in a preferably comparatively large volume here as well.

In the method for short-coherence holography, in-line holography is preferably used. This usually reduces the demands on the size of the pixel pitch in rasterized detectors significantly.

In the method for short-coherence holography, holography with phase-shift technology is preferably used. This can usually improve the signal-noise ratio significantly. Here, the phase shift can preferably be performed by means of micro-scan at a small-mass mirror in a frequency comb light source. This acts like a phase shift in the reference arm of a holographic interferometer—in one takes the resonator geometry of the frequency comb light source into account.

In one aspect, in an arrangement for short-coherence holography for a technical or biological, at least partially light-diffusing object or for at least partially light-diffusing object elements for obtaining a 2D or 3D point cloud in the microscopic, mesoscopic, specifically also the in-vivo 3D detection of the shape of a tooth or several teeth in the mouth of a person, or on the macroscopic scale, or for endoscopic 2D or 3D metrology of technical or biological, at least partially light-diffusing objects accompanied by obtaining a 2D or 3D point cloud, or also for distance measurement or depth determination of an at least partially light-diffusing object, a surface-like hologram detection area HDB is located at the output of the holographic interferometer.

At least one short-coherence light source or a quasi short-coherence light source is arranged upstream of the arrangement for short-coherence holography. Here, light is particularly understood to be electromagnetic radiation from terahert, via IR, VIS through to UV and EUV radiation.

The holographic interferometer, in its surface-like hologram detection area HDB at a point DP of the hologram detection area HDB, for an optically detected object point OP_k, always has an optical path difference x_OP_k_DP that is clearly different from zero.

At least one rasterized detector spectrally integrally detecting at least in spectral sub-ranges is arranged in this hologram detection area HDB. The rasterized detector can be formed as a monochrome matrix CCD or matrix CMOS camera or as a color matrix CCD or color CMOS camera, in a single-chip or multi-chip arrangement. Preferably, several camera chips or a plurality of camera chips in matrix form are arranged. The rasterized detector can preferably be formed by a plurality of camera chips in matrix form, wherein preferably the arrangement of several chip matrices is possible as well, for example one for a specific spectral range.

According to the invention, at least one short-coherence light source or/and at least one quasi short-coherence light source having frequency comb characteristic is formed and assigned to the holographic interferometer. If several short-coherence light sources having frequency comb characteristic are used, which supply light to the holographic arrangement specifically in separate spectral ranges, each spectral range can be assigned its own rasterized detector or a matrix of rasterized detectors. Here, the individual short-coherence light sources having frequency comb characteristic preferably have a different optical delay length each, so that a different frequency interval in the frequency space results for each short-coherence light source having frequency comb characteristic. These short-coherence light sources having frequency comb characteristic and a different spectral range each can be operated at the same time. For example, by analogy with the two or multi-wavelength technology of interferometry, it is possible to apply a quasi beat technology with different delay lengths of frequency comb light sources, for example with two frequency comb light sources. Here as well—by analogy with the known two-wavelength technology—a larger uniqueness range is obtained, which results as a beat delay length Y12 from the delay length Y1 and the delay length Y2 of the two short-coherent frequency comb light sources used.

It is also possible to detect light—here, always in form of holographic interferences—of two short-coherent frequency comb light sources, which have different delay lengths Y1 and Y2 and operate in different spectral ranges each, with a single-chip color camera or several single-chip color cameras.

Preferably, in an arrangement for short-coherence holography, the short-coherence light source or quasi short-coherence light source having frequency comb characteristic is formed as at least one single frequency comb laser with a delay length Y1. By means of the frequency comb technology, frequency combs of high quality can be obtained.

An example of a frequency comb laser, which can particularly be used for holography on the microscopic and optionally also on the mesoscopic scale, is a monolithic torodial microresonator with an optical delay length Y1 in the order of approximately 400 micrometers and a coherence length lc in the medium one-digit micrometer range at a central wavelength of approximately 1550 nm and a spectral range of approximately 400 nm. This is described in the scientific paper "Optical frequency comb generation from a monolithic microresonator" by P. Del'Haye, A. Schließer, O. Arcizet, T. Wilken, R. Holzwartha, and T. J. Kippenberg in nature, vol. 450, 20, 27. December 2007 (doi:10.1038/nature06401) [4]. This monolithic torodial microresonator also has a very high resonator quality and an extraordinarily precise equidistance of the frequency interval. As stated there, an optical delay length Y1 of approximately Y1=800 micrometers has been realized, which can be calculated from the reported frequency interval delta_f, here delta_f=375 GHz, with Y1=c/delta_f.

With two monolithic, toroidal microresonators, cf. [4], for example with a first optical delay length Y1 in the order of approximately 500 micrometers and a second optical delay length Y2 in the order of approximately 555 micrometers, and each with a coherence length lc in the medium one-digit micrometer range at a central wavelength of approximately 1550 nm and a spectral range of approximately 400 nm, a two frequency comb technology, i.e. as a frequency comb technology with two frequency combs, can be performed for micro-profile detection or 3D miniature form detection. Here, the two monolithic, toroidal microresonators can be switched on reciprocally. They then have the centroid wavelengths 1350 nm for the first and 1650 nm for the first microresonator.

The uniquely addressable object depth range Ys/2 results by analogy with the two wavelength technology from the beat delay length Ys with $Ys = Y1 \cdot Y2/(delta\_Y)$ so that the uniquely addressable object depth range Ys/2 is approximately 2.52 millimeters.

Here, it is also possible that, by optical filtering, the first monolithic, toroidal microresonator and the second monolithic, toroidal microresonator emit frequency comb light in the spectral range slightly below 1550 nm and in the spectral range slightly above 1550 nm, respectively, and in the two mentioned spectral ranges a number j1 and a number j2 of holograms is recorded simultaneously by means of a two-range spectral camera. In this way, very fast 3D miniature form detection is possible. A holographic arrangement according to the Fourier approach can be used advantageously here.

This approach with two microresonators with a data-based beat range, which illuminate the object in two different spectral ranges and thereby allow simultaneously capturing two hologram stacks in two separate spectral ranges, is a very promising approach for the measurement of a tooth shape. This goes for metallic gear teeth on the one hand. On the other hand, it particularly goes or the in-vivo measurement of the tooth shape in the mouth of a person, including tooth regions with shiny metal crowns. The advantage rather increases in the in-vivo measurement with shorter-wave light, since then teeth as the object of measurement usually become more cooperative.

In addition, with the monolithic microresonator illustrated in [4], a very compact arrangement for single-shot testing of three-dimensional optical micro-signatures can be established, which can ensure a very high safety standard.

Preferably, in an arrangement (device) for short-coherence holography, means for changing the delay length Y1, Y2, or also Yi of at least one frequency comb light source are arranged. Thereby, the formation of holographic interferences can also be made possible when a short-coherence light source is used. With frequency comb lasers having a clearly larger delay length than microresonators, for example then with delay lengths Y1 of 300 nm or 1000 nm, a change of the delay length is feasible comparatively well.

If frequency comb lasers with a delay length Y1 of 1000 nm are used, clearly smaller effective delay lengths Y1_eff of e.g. Y1_eff=100 nm can be obtained as well with suitable means, which corresponds to a correspondingly larger frequency interval delta_f in the frequency space. These suitable means also allow a predetermined change of the effective delay length Y1_eff.

If required, these means can also be used for a phase shift, which is very advantageous or rather absolutely essential to in-line holography.

Preferably, in an arrangement for short-coherence holography, means for changing the mean optical path difference Xm of the holographic interferometer are arranged in order to be able to generate holograms. This is particularly advantageous to holographically fully detect objects having a comparatively large depth extension, in particular if the coherence length lc is selected to be comparatively small in the interest of an improved depth resolution, for example only 10 micrometers for holography on the microscopic scale.

Preferably, in an arrangement for short-coherence holography, the holographic interferometer is formed as a Michelson interferometer. Thus, the object illumination light and the returning light used for hologram formation are at least partially coaxial, which can be of great advantage to the inspection of boreholes and narrow craters.

Preferably, in an arrangement for short-coherence holography, a spherical mirror or a paraboloid of revolution mirror with its focal plane in the reference ray space is arranged in the reference arm of the Michelson interferometer. In this way, at least for flat objects with a comparatively small lateral extension and a corresponding orientation thereof, the case of Fourier holography can be approximated well if the focal plane of the spherical mirror or a paraboloid of revolution mirror is at least approximately optically conjugated to the medium object plane "as viewed from the hologram plane", which is a particular advantage to hologram evaluation—for reasons well known to the skilled person. The focal plane of the spherical mirror or a paraboloid of revolution mirror is preferably at least approximately parallel to the input wavefronts, which are preferably plane.

Preferably, in an arrangement for short-coherence holography, means for laterally shifting the spherical mirror or the paraboloid of revolution mirror are arranged. This is particularly advantageous to the near range and with a comparatively large object field. To this end, the paraboloid of revolution is shifted in the Michelson interferometer so that also for object points far to the outside of the field the Fourier case can be approximated well. In this way, object spherical waves of object points located to the outside of the field are assigned a reference spherical wave as well, which is well adapted with respect to the location of their source point, so that also with a short coherence length lc, a hologram fully covering the rasterized detector can still be formed—always with only few fringes then. For the object points lying to the inside of the field, the conditions should deteriorate accordingly after this lateral shift.

Preferably, in an arrangement for short-coherence holography, a spherical mirror or an off-axis paraboloid of revolution mirror with a miniaturized end mirror is arranged in a reference arm of the Michelson interferometer, which is arranged at least approximately in the focus of the mirror. This makes a cat's eye arrangement, which can be of great advantage.

Preferably, in an arrangement for short-coherence holography, the miniaturized end mirror is assigned means for a highly dynamic phase shift. Due to the small mass of the miniaturized end mirror, this is a considerable advantage with respect to the obtainable dynamics in the phase shift. These means are preferably formed as piezo-actuators.

Preferably, in an arrangement for short-coherence holography, the holographic interferometer is formed as an interferometer with a location for beam splitting and a location for beam convergence, these locations being spatially completely separate from each other.

Preferably, in an arrangement for short-coherence holography, the holographic interferometer is formed with a U arrangement in the reference optical path and a V arrangement in the object optical path. Thus, for the light returning from the object, means for adjusting the cross-section of the bundle of rays—mostly for reducing the cross-section of the bundle of rays—can be arranged. The U arrangement in the reference optical path allows adapting the mean optical path difference by a shiftable end reflector, which can preferably be formed as a roof prism mirror.

Preferably, in an arrangement for short-coherence holography, an end reflector with lateral shear and preferably in an at least partially retro-reflective manner and preferably as a roof prism mirror is arranged in the reference optical path. Preferably, it is arranged at the end of a U-optical path in the reference arm of the holographic arrangement. This can make a cat's eye arrangement as well, which can be of great advantage.

Preferably, in an arrangement for short-coherence holography, an optical system reducing the cross-section of the bundle of rays is assigned to the holographic interferometer for object light in the propagation direction to the detection. This optical system reducing the cross-section of the bundle of rays in the object optical path can be for adjusting a laterally far-extended object bundle of rays, coming from a far remote light-diffusing object point, to the size of the rasterized high-pixel detector with a very small pixel pitch. Here, the optical system reducing the cross-section of the bundle of rays, preferably in the form of a reflecting telescope, can have an aperture diameter of 2r=200 mm on the object side so as to obtain a lateral object resolution in the one-digit millimeter range when the object distance is 100 m, which can be of great advantage to the inspection and sensor-guided repair of damaged power plant components. At the same time, the depth resolution can also be in the one-digit millimeter range when the coherence length is correspondingly small. Here, the rasterized detector can perfectly have 100 million pixels. In the prior art, however, these parameters can in no way be obtained with commercially available time-of-flight cameras.

Preferably, in an arrangement for short-coherence holography, the holographic arrangement is formed as an in-line arrangement with an optical system reducing the cross-section of the bundle of rays for object light that returns. This optical system reducing the cross-section of the bundle of rays in the object optical path for light that returns can also be for adjusting a laterally far-extended object bundle of rays that returns, coming from a far remote light-diffusing object point, to the size of the rasterized high-pixel detector with a very small pixel pitch. Here, the optical system reducing the cross-section of the bundle of rays, preferably in the form of a reflecting telescope, can have an aperture diameter of the object-side mirror of 2r=300 mm so as to obtain a lateral object resolution in the range of 0.1 mm surely for an object field of 300 mm when the object distance is 20 m, which can be of great advantage to the sensor-guided inspection and sensor-guided repair of damaged power plant components.

Moreover, when high-aperture mirror components and high-resolution rasterized detectors are used, power plant components to be disposed of can be inspected at distances of 10 m with a resolution of 0.1 mm in all three spatial coordinates, for example to find weakly gaping cracks in containers or detect cable breakage in electrical components.

Thus, this relates to 3D sensor technology, which can advantageously be used for dismantling nuclear power plants.

Basically, multi-aperture technologies—preferably with mirror arrays—can be applied here as well to obtain a higher effective numerical aperture in the object detection by means of a hologram, which thus also allows an improved lateral resolution. Here, each single mirror of a mirror array can be assigned its "own" camera chip. Further preferably, a wavefront-forming optical system can be arranged in front of the input of the holographic arrangement, which can preferably also serve to illuminate the object field optimally.

Moreover, wavefront forming can preferably be performed in the reference arm.

It should be noted explicitly that the Fourier holography and the short-coherence technology match with the frequency comb light source technology particularly well, since in this combination the rasterized detector can be filled with a usually well-modulated hologram also in case of application of a short-coherence light source—at least for comparatively small object fields. This hologram does not tend to have extremely high densities of the interference fringes, which is a significant technical advantage.

In a further preferred embodiment, the invention provides a teaching concerning methods and arrangements that can specifically contribute to improving space safety, specifically also to identifying moving objects on the basis of the profile or the shape, which objects can pose a risk to other space objects, to inhabited regions, or to the natural environment on the earth's surface.

Further, moving vehicles and/or planes can be sampled optically as well so as to determine their profiles or shapes. Moreover, vibrating machine and/or vehicle components can be detected with respect to their 2D or 3D shapes as well.

In this preferred embodiment, the invention allows generating optical signals in form of holograms on the basis of short-coherence holography also of fast moving or vibrating objects, which can also be located at a greater distance, which are suitable for being recorded by available rasterized detectors. By numerical reconstruction of the detected holograms, the profile or shape of the moving or vibrating object is to be represented at least partially.

In a preferred embodiment, the method specifically is a holographic method by means of a holographic measuring arrangement, which can particularly be used for optical sectioning on moving objects, particularly also in space. Here, the term light is particularly used as a synonym for electromagnetic radiation from the terahertz, via infrared through to the deep UV spectrum.

Specifically, the holographic measuring arrangement includes at least one frequency comb light source with a comparatively small coherence length lc with respect to the object extension and with controllable frequency comb light by predetermined change of the optical path length L1 in its integrated cavity or in at least one cavity assigned to this frequency comb light source. In particular, at least one short-coherence light source and/or quasi short-coherence light source as described above can be used, wherein said light source is now controllable to control the frequency comb light by varying the optical path length according to the here-described procedure.

Preferably, the measuring arrangement further includes an unbalanced two-beam interferometer with a reference arm and an object arm, which applies measuring light from the frequency comb light source to the moving object, with a detection channel for measuring light that returns. Specifically, an unbalanced two-beam interferometer is understood to be an interferometer for generating a reference bundle of rays and an object bundle of rays in the above-described way, in which a mean optical path difference Xm different from zero exists.

Preferably, the measuring arrangement further includes at least one rasterized detector for capturing holograms and with a computer or computer system for the highly dynamic control of the frequency comb light source and synchronization of hologram capture with respect to the controllable frequency comb light source and algorithms for numerical hologram reconstruction. Specifically, the detector is the above-described detector, which is particularly arranged in the surface-like hologram detection area HDB at the output of the interferometer.

In addition, in this preferred embodiment, the measuring arrangement comprises means for at least approximately determining the distance and the velocity of an object to be measured and an interface for data transfer.

Specifically, an unbalanced two-beam interferometer in connection with the rasterized detector is understood to be an interferometer for generating a reference bundle of rays and an object bundle of rays in the above-described way, in which a mean optical path difference Xm different form zero exists, and which, at its output, exhibits a surface-like hologram detection area HDB, in which at least one rasterized detector spectrally integrally detecting at least in spectral sub-ranges is arranged, and which in its surface-like hologram detection area HDB at a point DP of the HDB, for an optically detected object point OP, always has an optical object point-related path difference x_OP_DP different from zero.

The frequency comb light source can be a femtosecond frequency comb laser system, a microresonator frequency comb laser, a microresonator frequency comb laser system, or also a frequency comb light source on the basis of a Fabry Perot cavity fed by a superluminescence diode. The use of the latter frequency comb light source for frequency comb interferometry was described in I. Harder, G. Leuchs, K. Mantel, and J. Schwider in the scientific article: "Adaptive frequency comb illumination for interferometry", in der scientific publication Applied Optics 50, no. 25, pages 4942-4956 (2011).

In a preferred embodiment, at least one measurement for determining the distance and the velocity—or a multiple measurement of the distance, also by means of a conducted time measurement suitable for determination of the velocity of an object to be measured, which with at least one component of its movement also moves in the propagation direction of the measuring light, is performed. The order or magnitude of the distance and the velocity is thus available as information in measurement real time at least approximately, and is provided for the measurement method for shape detection by means of optical sectioning.

In the holographic sampling process, the spatial pulse interval Y1 (optical delay length) of the emitted short pulses of a pulse train of the frequency comb light source is changed by a predetermined change of the optical path length of at least one integrated cavity or a cavity assigned to the frequency comb light source on the basis of the information about the velocity and distance of the object, which is provided in real time. The cavity influences the frequency comb light in its frequency comb interval.

The optical path length of this cavity is changed in form of a long scan—either increased or decreased, so that the ordinal number q of object-sampling short pulses is kept constant for at least the capturing time delta_t_Hol of a hologram.

Here, the ordinal number q results from the quotient of optical path length l_opt, from the position of optical path difference zero at the interferometer in the object optical path to a sampled object point OP, and the spatial pulse interval Y1. It applies for the ordinal number $$q = l\_opt / Y1$$

The ordinal number q is kept constant by making the first derivative over time of the spatial pulse interval, which results from the delay length of the frequency comb-forming cavity, at least approximately equal to a value of 2/q-times (i.e. 2 divided by q) the component of the velocity of the object in the movement direction or the difference velocity between the holographic capturing device and the object. With respect to the above-described ordinal number "n1", it preferably applies at least approximately $2q = n1$.

Thus, the phase in the hologram is to change by less than 2 Pi at least in a sub-range thereof. Here, the optical path length Loot always exceeds the spatial pulse interval Y1.

At least one hologram is captured by means of a rasterized detector, and a numerical reconstruction thereof is performed, whereby at least one sectional plane or one sectional area through the sampled object is calculated. Here, the sectional area can be curved.

Due to the multiplication effect with the ordinal number q, given by the FC light source (frequency comb light source), the cavity only has to be adjusted—shortened or extended—by a fraction of the optical path difference, given by the object position, per unit of time. The higher the ordinal number q at the given velocity v and object distance, the slower, but more precise, e.g. in the one-digit nanometer range or sub-nanometer range, the optical path length of the integrated or assigned cavity has to be adjusted.

Such an object-controlled controlled frequency comb light source can also be referred to as an adaptive yoyo frequency comb light source.

Measuring the moving or vibrating object for determining the required absolute object distance—of at least one object point—can be performed by means of double frequency comb laser technology or optical time-of-flight measurement technology.

Further, the spatial pulse interval Y1 can be made small to the waveoptical depth of field D in the detection channel of the holographic measuring arrangement. This can be done in order to achieve a simultaneous detection of the object in several, comparatively closely adjacent (Y1/2) sectional planes (multi-sectioning) if then the detection time for a hologram is made sufficiently small. To this end, preferably also the respective current, single optical delay length L1 of the cavity is determined.

Moreover, the capturing period delta_t_Hol for a hologram should preferably not substantially exceed the movement period delta_t-depth for passing the waveoptical field of depth D of the holographic detection by the moving object so as to obtain a sufficiently great modulation in the entire hologram if possible, wherein the waveoptical field of depth D is predetermined by the effective numerical aperture and the centroid wavelength of the detecting radiation.

Further, preferably at least two frequency comb light sources each with a respective optical length of the cavity controlled by the distance and velocity measurement can be employed, of which only one determines the respective current spatial pulse interval Y1 at a time, and respectively one short-pulse frequency comb light source with the active variable cavity samples the object optically in at least one sectional plane E or a weakly curved surface, so that the object is at least partially holographically detected alternately, but always by one of the two frequency comb light sources and the rasterized detector, and thus at least two, usually a plurality of holograms, are captured sequentially.

Moreover, at least one short scan can be performed for varying the optical length of the frequency comb-generating cavity, whereby an at least approximately step-like course of the optical path length of the cavity over time results. Here, this is done with a multiplication effect. This can be done to detect a slightly different depth range of the object in a predetermined way. The sectional plane E or also the sectional curved surface thus slightly moves across the object. Therefore, consecutive short scans can scan through the object in depth.

Further, a scan of the reference mirror can be performed between one or several hologram captures to have a further degree of freedom for matching the optical paths in the holographic interferometer. This can be done to detect another depth range of the object in a permanent scan in a predetermined way. On the other hand, a highly dynamic fine control can be performed as well, in particular if the reference mirror, being located directly on a piezo-actuator, is made very small in a focused optical path. In this way, even the smallest vibrations in the measurement system can be compensated for almost completely. To this end, suitable reference signals are required, however, which will not be explained here in further detail.

Moreover, at least part of the hologram formed by means of an object can be supplied to preferably high-speed photodetectors measuring point by point. This serves to obtain a control signal for fine control of the optical path length of the cavity with the aim of "freezing" a hologram on the rasterized detector in the period of hologram detection.

Further, high-speed image pickup of the holograms formed by means of an object can be performed. This makes sense when the control of the optical path length of the cavity is not perfect or when vibrations or shocks occur.

The invention will be described exemplarily on the basis of the preferred embodiments illustrated in FIGS. 1 to 14. Here, the term light is always used as a synonym for electromagnetic radiation from the terahertz, via infrared through to the deep UV spectrum.

FIG. 1 relates to the detection by means of a holographic arrangement. A frequency comb laser 1a having a wavelength of around 800 nm is arranged, said laser having suitable means to generate frequency comb light with a frequency interval delta_f1=c/Y1, where Y1 represents the delay length, which is to be 300 mm. The coherence length lc is at least approximately 200 µm. The spatially highly coherent bundle of light, which emanates from the frequency comb laser 1a and which is to have plane wavefronts in the waveoptical model here, is expanded by a mirror expansion optical system 2 and is incident on the beam splitter 3 of a Michelson interferometer, wherein a reference bundle and an object bundle are formed. The portion of the incident bundle of light passing through the beam splitter 3 is reflected in the reference arm R by a paraboloid of revolution 4 at the time j, the focal point F of which being located on the centroid ray SWT of the bundle of light incident on the paraboloid of revolution 4. The focal point F thus represents the origin of a spherical wave, here the reference spherical wave, for the focused bundle of light.

The bundle reflected at the beam splitter 3 is incident on the object 5, which here is to have a ruled geometry in form of a rotationally symmetric cone. Representatively, an object point OP_k that emits a spherical wave Kk by light diffusion is illustrated here. The circular arc section KBA from the focal point F into the object space O, on which the object point OP_k is at least approximately located, makes clear that the radii of curvature of reference spherical wave and object spherical wave k are at least approximately equal, so that the case of Fourier holography is very well approximated. A portion of the reference spherical wave is reflected at the beam splitter 3 toward the rasterized detector 6. Also, a portion of the object spherical wave Kk passes the beam splitter 3 toward the rasterized detector 6. A Fourier hologram kj forms from the object point OP_k on the rasterized detector 6. Due to the small coherence length lc of only approximately 200 micrometers, only a small portion of the object points of the object 5 forms Fourier holograms on the rasterized detector 6, namely those being located around the region Bj. The reason for this is that the optical path difference in the region Bj at least approximately corresponds to the single delay length Y1. The difference between the optical path difference in the region of the cone vertex and the single delay length Y1 is to be smaller than the coherence length lc of 200 micrometers here. Where this applies, object points of the cone can provide holograms that are recorded.

The paraboloid of revolution 4 is subjected to a scan to the left, wherein the scan step is to be 50 micrometers, so that the optical path difference delta_Xm changes by 100 micrometers. It is clear that the optical path difference in the hologram is usually not a constant. The focal point Fj+1, where j+1 defines the time, is located on the broken circular arc. Now, the slightly deeper object points in the region Bj+1 can form holograms, as the difference between the optical path difference in the region Bj+1 and the single delay length Y1 is made smaller than the coherence length lc of 200 micrometers. The Fourier case for the region near the cone vertex is also given for the region Bj+1. In this way, the addressed depth range ATB can be scanned gradually over time t by recording holograms.

The digital reconstruction of these recorded holograms poses a demanding task for the skilled person, but it can well be solved with knowledge of hologram reconstruction algorithmics and knowledge of computing technology.

Figure 2:
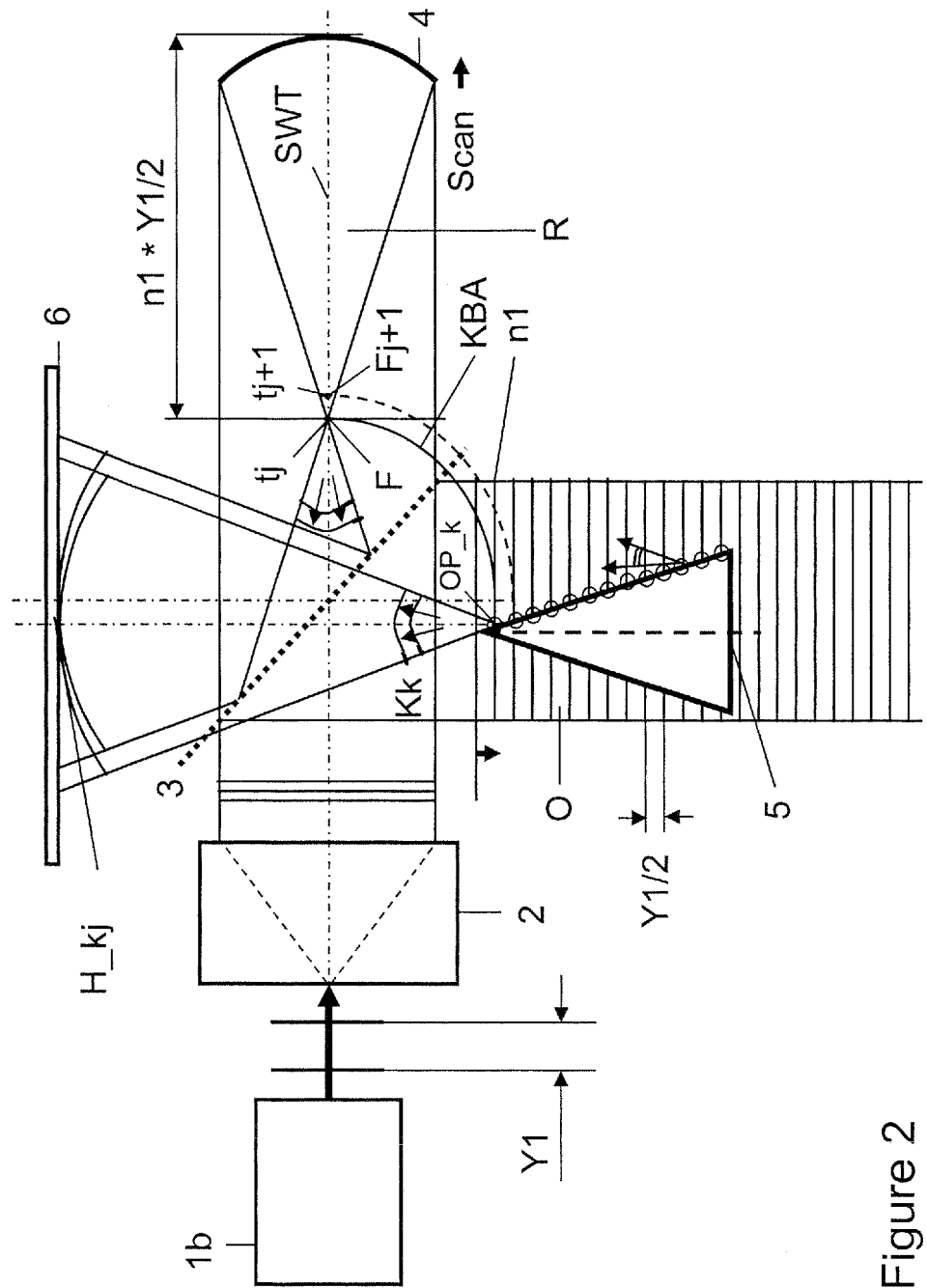
FIG. 2 relates to the detection of an object with a ruled geometry in form of a rotationally symmetric cone by means of a holographic arrangement.

FIG. 2 relates to the detection of an object with a ruled geometry in form of a rotationally symmetric cone having a height extension of approximately 200 mm with a base area diameter of 30 mm, which is made of a metallic material that appears to be semi-mat, i.e. at least partially light-diffusing, by means of a holographic arrangement. Here, the object is located in the near range of this holographic arrangement. The task is to perform a measurement of the circularity deviation with a measurement uncertainty of 50 micrometers at height intervals of 25 mm on the surface of the cone. Thus, a-priori information about the object exists, and it is known that the object does not have any visible damages or greater deviations from the target geometry. To illuminate the holographic arrangement, a frequency comb laser assembly 1*b* having a wavelength of 840 nm is arranged, said assembly having suitable means to generate frequency comb light with the frequency interval delta_f=c/Y=6 GHz, where Y1 represents the delay length that is to be 50 mm. The coherence length lc is 50 µm. The spatially highly coherent bundle of light, which emanates from the frequency comb laser 1*b* and which is to have plane wavefronts in the waveoptical model here, is enlarged in cross-section by a mirror expansion optical system 2 and is incident on the beam splitter 3 of a Michelson interferometer, wherein a reference bundle and an object bundle are formed. The portion of the incident bundle of light passing through the beam splitter 3 is reflected in the reference arm R by a paraboloid of revolution 4, the focal point F of which being located on the centroid ray SWT of the bundle of light incident on the paraboloid of revolution 4. The focal point F thus represents the origin of a spherical wave, here the reference spherical wave, for the focused bundle of light.

The bundle reflected at the beam splitter 3 is incident on the object 5, which here is to have a ruled geometry in form of a rotationally symmetric cone. Representatively, an object point OP_k that emits a spherical wave Kk by light diffusion is illustrated here. The circular arc section KBA from the focal point F into the object space O, on which the object point OP_k is at least approximately located, makes clear that the radii of curvature of reference spherical wave and object spherical wave k are at least approximately equal, so that the case of Fourier holography is very well approximated. A portion of the reference spherical wave is reflected at the beam splitter 3 toward the rasterized detector 6. Also, a portion of the object spherical wave Kk passes the beam splitter 3 toward the rasterized detector 6. A Fourier hologram FH_kj forms from the object point OP_k on the rasterized detector 6. Due to the coherence length lc of approximately 50 micrometers, only a small portion of the object points of the object 5 forms Fourier holograms on the rasterized detector 6, namely those being located around the region Bj. Due to the delay length Y1, here with 50 mm, regions form on the object at a distance Y1/2, here every 25 mm, which can provide holograms. Thus, the measurement of such a body is possible by capturing (recording) and digitally evaluating (reconstructing) three phase-shifted holograms. To this end, the rasterized detector used should have a camera chip with a diagonal of about 90 mm (medium format camera) and a camera pixel pitch of rather less than 10 micrometers to surely obtain a lateral resolution of 0.1 mm and to be able to evaluate the object points located to the outside of the detected measurement field by means of associated holograms.

In this case as well, the digital reconstruction of the recorded holograms poses a demanding task for the skilled person, but it can well be solved with knowledge of hologram reconstruction algorithmics and knowledge of computing technology.

Figure 3:
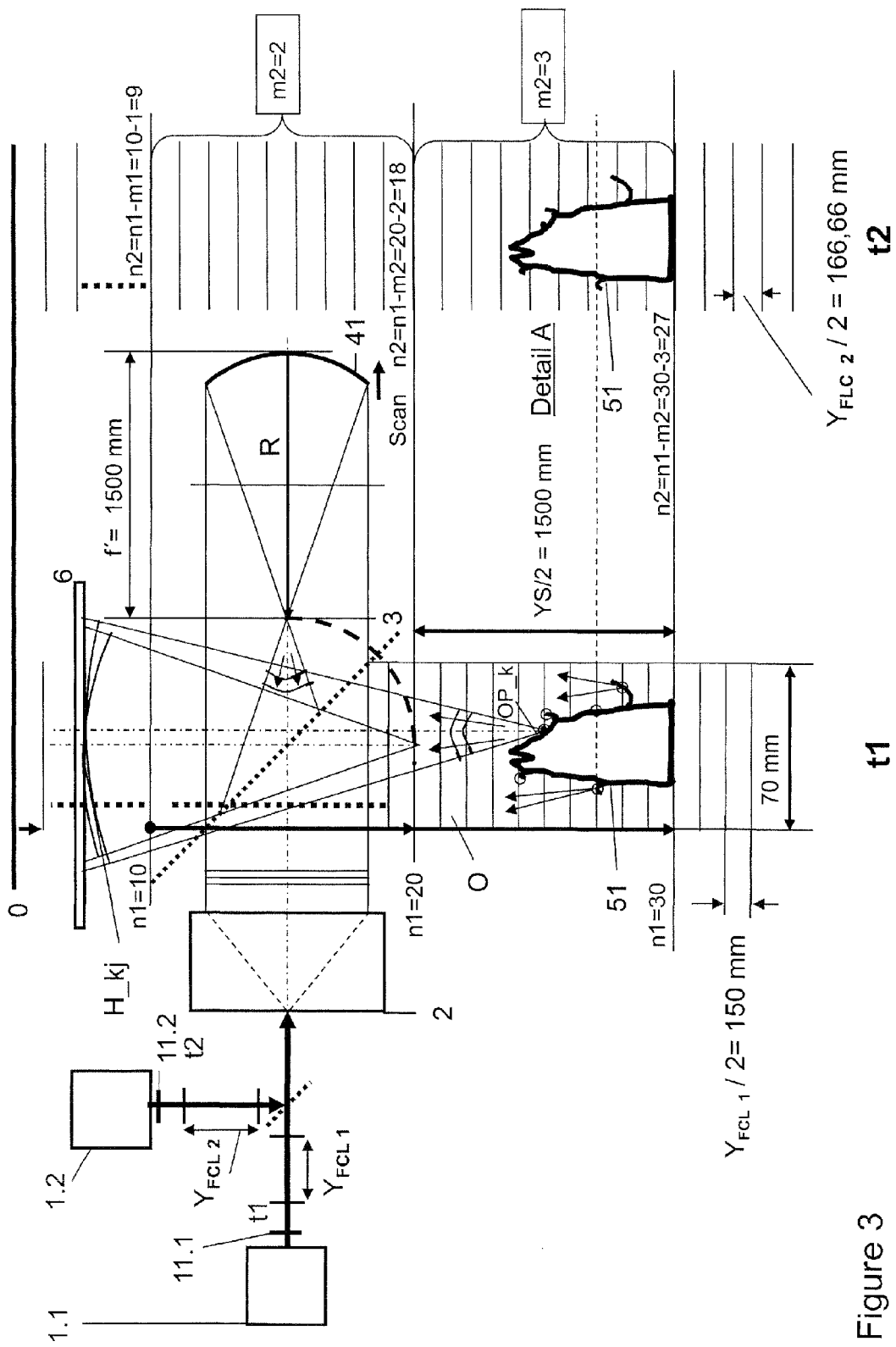
FIG. 3 relates to the localization and 3D detection—by means of a holographic arrangement—of e.g. a component in a power plant to be removed in case of damage by means of robots and 3D sensor technology without reliable a-priori information about both the 3D scene and the surrounding of the component and the current 3D shape thereof being available.

FIG. 3 relates to the localization and 3D detection—by means of a holographic arrangement—of e.g. a component in a power plant to be removed in case of damage by means of robots and 3D sensor technology without reliable a-priori information about both the 3D scene and the surrounding of the component and the current 3D shape thereof being available.

The object 51, here a severely damaged, widely expanded power plant component, is not located in the immediate near region of the holographic arrangement, but at a distance in the order of one meter. Now, the task is to examine the degree of destruction of this component, wherein depressions with a comparatively large aspect ratio are to be included in the measurement as well. The current 3D shape with a measurement uncertainty of 0.1 millimeter is determined in all three spatial coordinates. Thus, there is hardly any secure a-priori information about the object of the current state. To illuminate the holographic arrangement, a first frequency comb laser 1.1 and a second frequency comb laser 1.2 are arranged, which have a delay length Y1 of 300 mm and a delay length Y2 of 333.3 mm. The centroid wavelength is 840 mm each and the coherence length lc is 50 µm each. Here, the spatially highly coherent bundle of light emanating from the frequency comb laser 1.1 at a time t1, which is made possible by an opened microaperture 11.1, exhibits plane wavefronts and is enlarged in cross-section by a mirror expansion optical system 2. In the second frequency comb laser 1.2, the downstream microaperture 11.2 is closed.

The frequency comb light of the first frequency comb laser 1.1 is incident on the beam splitter 3 of a Michelson interferometer, wherein a reference bundle and an object bundle are formed. The portion of the incident bundle of light passing through the beam splitter 3 is reflected in the reference arm R by a paraboloid of revolution 41, the focal point F of which being located on the centroid ray SWT of the bundle of light incident on the paraboloid of revolution 41. The focal point F thus represents the origin of a spherical wave, here the reference spherical wave, for the focused bundle of light.

The bundle reflected at the beam splitter 3 is incident on the object 51. Representatively, an object point OP_k is illustrated here. The case of Fourier holography is not very well approximated here. If the spatial situation permits, the distance from the object 51 should be reduced for further inspection for obvious reasons.

A portion of the reference spherical wave is reflected at the beam splitter 3 toward the rasterized detector 6. Also, a portion of the object spherical wave passes the beam splitter 3 toward the rasterized detector 6. A H_kj forms from the object point OP_k on the rasterized detector 6. Due to the coherence length lc of approximately 50 micrometers, only a small portion of the object points of the object 51 forms holograms on the rasterized detector 6. To this end, the rasterized detector used should have a camera chip with a diagonal of about 85 mm (medium format camera) and a camera pixel pitch of rather less than 10 micrometers to surely obtain a lateral resolution of 0.1 mm and to be able to holographically evaluate the object points located to the outside of the detected measurement field.

Likewise, this is performed by means of frequency comb light of the second frequency comb laser 1.2 with the microaperture 11.2 being open and the microaperture 11.1 being closed. The scan situation is illustrated in detail A. The beat period Ys can be seen. The different positions of the hologram-forming areas can be clearly seen.

The measurement is performed such that at first the first frequency comb laser 1.1 (phase 1) and then the second frequency comb laser 1.2 (phase 2) illuminates the object 51. In both phases, several phase-shifted holograms are recorded. Subsequently, a small scan step is taken at the spherical mirror 41, here 10 micrometers, and the process of hologram recording starts again. In the case of a full scan of the delay length Y1 of 150 mm, this results in an order of 100000 holograms, which results from the recording of respectively three phase-shifted holograms per scan position of the spherical mirror 41 and per frequency comb laser. After reconstruction, however, they provide the high-resolution 3D information about an object depth range of more than one meter at a lateral resolution of at least 0.1 millimeter and a depth resolution of 0.01 millimeter.

In this case as well, the digital reconstruction of the recorded holograms poses a demanding task for the skilled person, but it can well be solved with knowledge of hologram reconstruction algorithmics and knowledge of computing technology.

Figure 4:
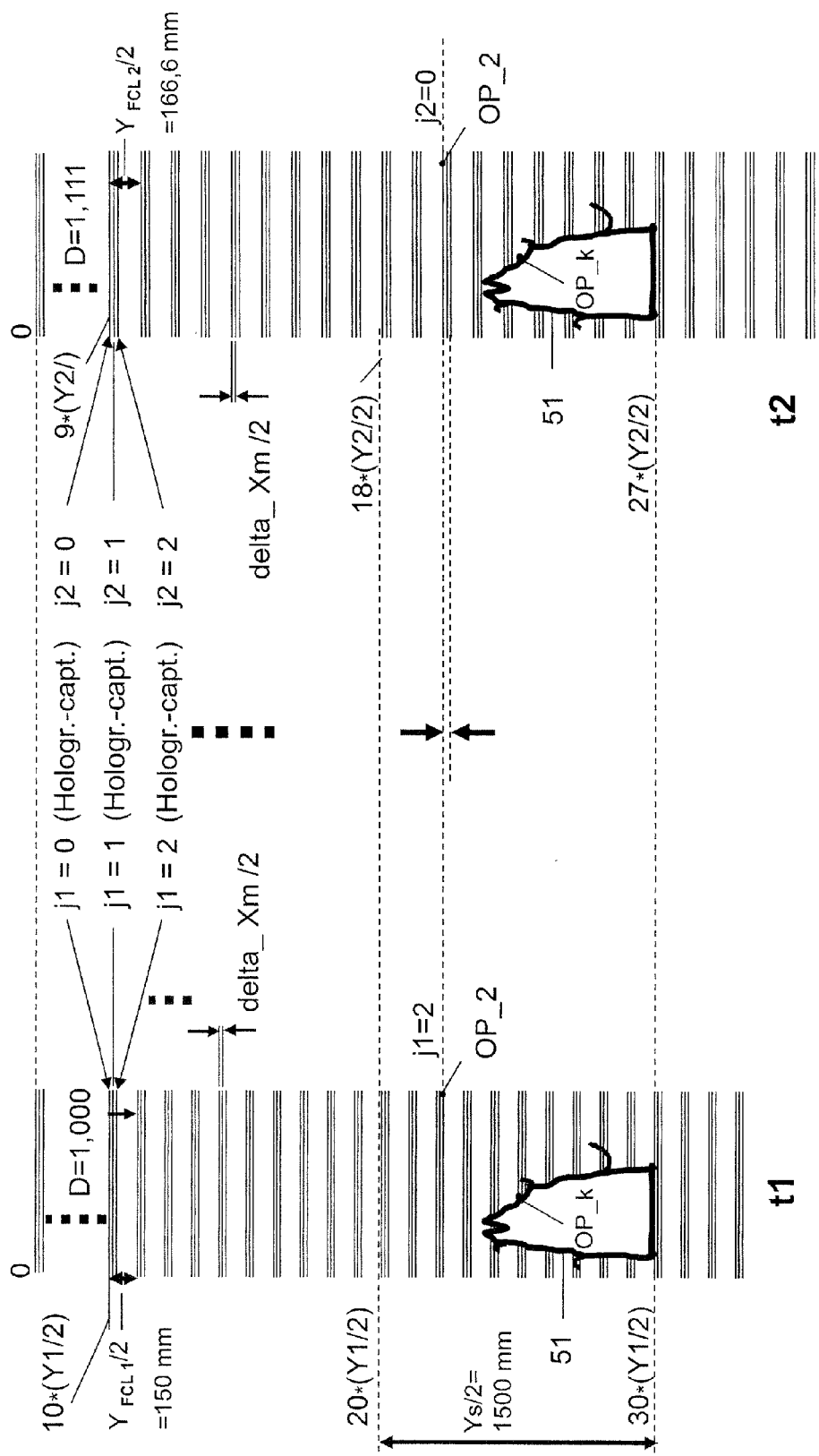
FIG. 4 shows the situation where the coherence length is approximately 30 millimeters in each case and the scan step width at the spherical mirror is selected to be about 10 millimeters here.

FIG. 4 shows the situation where the coherence length is approximately 30 millimeters in each case and the scan step width at the spherical mirror 41 is selected to be about 10 millimeters here. Then, this scene can be described with approximately 100 holograms, wherein the achievable depth resolution now is in the order of 10 millimeters, but the high lateral resolution of at least 0.1 millimeters remains. Depending on the required knowledge of damage to the object 51, the measurement process can be focused on individual details.

Figure 5:
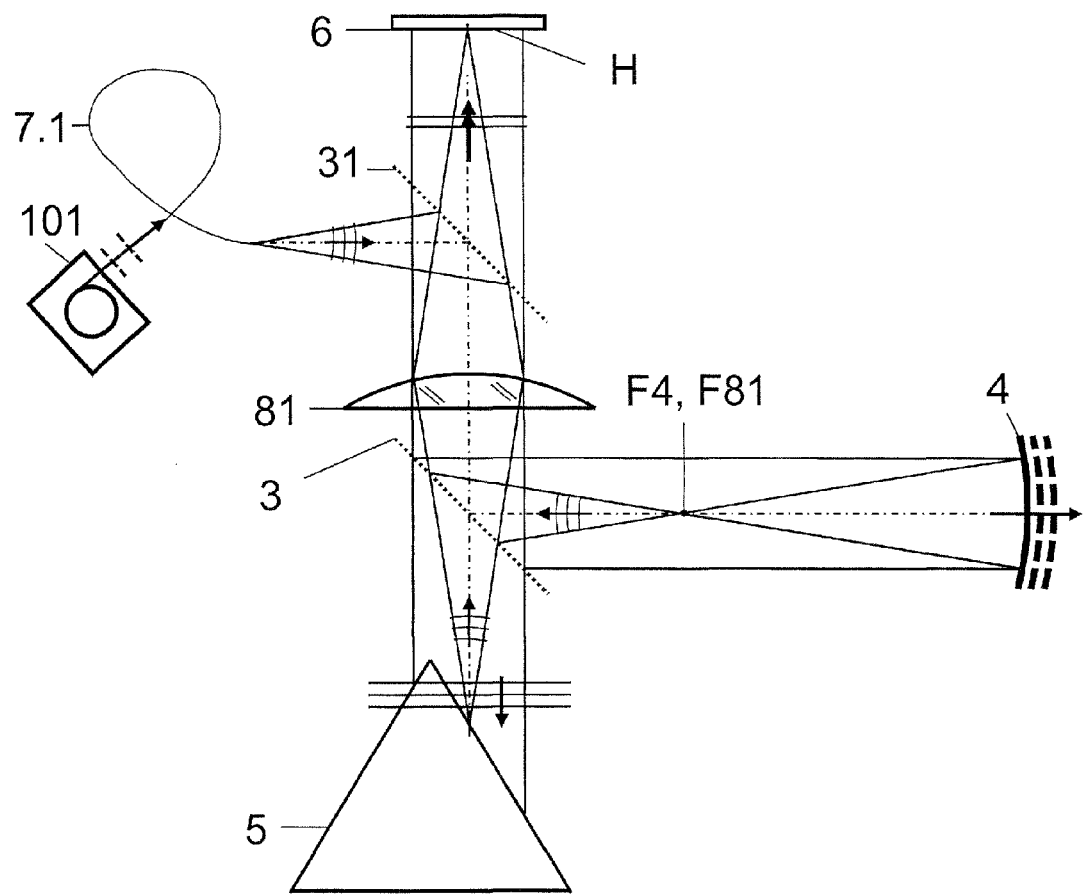
FIG. 5 shows a holographic arrangement for measuring objects having dimensions in the one-digit millimeter range.

FIG. 5 shows a holographic arrangement for measuring objects having dimensions in the one-digit millimeter range. The frequency comb light having the centroid wavelength Lamba_S of 840 nm and a coherence length of smaller than 100 µm, which goes into the monomode fiber 7.1 from a frequency comb laser 101 with annular microresonator, emanates from the end of the monomode fiber 7.1 after passing same and forms a spherical wave after having emanated therefrom. The delay length Y1 between two consecutive pulses is 400 µm. The light is incident on a coupling-in beam splitter 31 and is collimated at the collimator 81, where subsequently a reference bundle is formed at the beam splitter 3 of a Michelson interferometer. This reference bundle reaches the spherical mirror 4, which focuses the bundle in its focal point F4, which at the same time represents the focal point of the collimator 81. In this way, after passing the beam splitter 3 again, a collimated bundle of rays forms again, which after passing the coupling-in beam splitter 31 reaches the camera 6 as a reference bundle, where it forms the reference wave for a hologram.

The light, which after emanating from the fiber 7.1 passes the beam splitter 3 in transmission and is collimated by means of the collimator 81, forms the object bundle that forms many spherical waves at the light-diffusing object points of the object 5. The object 5 has an extension in the one-digit millimeter range. The spherical waves formed are detected by the collimator after passing the beam splitter 3 and reach the camera 6 via the coupling-in beam splitter 31 after wavefront shaping, where a Fourier hologram is formed, as a plurality of object points is located at least approximately close to the focal plane of the collimator. The distance of the planes in the object space, which contribute to the hologram due to the small coherence length, is Y1/2 200 µm here. The spherical mirror 4 is shifted in a fraction of the delay length Y1 between two consecutive pulses by means of a scanner not illustrated here in order to scan the object holographically in depth. Moreover, in each setting position, 3 steps of one eighth of the centroid wavelength Lambda_S are performed by means of a piezo-actuator not illustrated here, and a hologram is captured in each setting position in order to be able to apply the phase-shift method in the known manner. From the thus obtained hologram stack, the image of the object 5, here the intensity, is numerically reconstructed by means of digital computing technology in a manner well known to the skilled person. Thus, the image information is numerically provided layer by layer and put together to form an overall image of the object 5.

Figure 6:
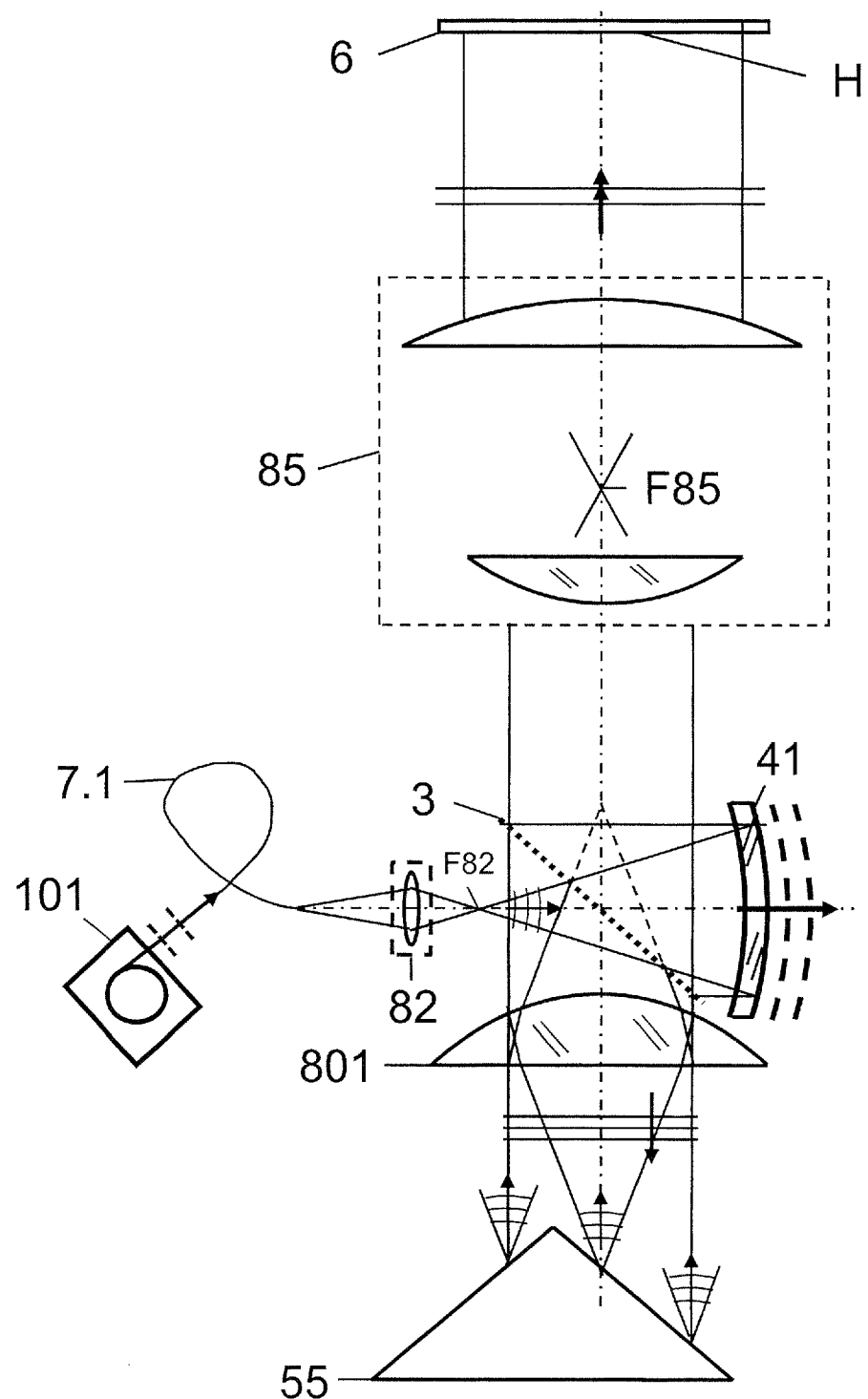
FIG. 6 shows a holographic arrangement for measuring objects having dimensions in the sub-millimeter range.

FIG. 6 shows a holographic arrangement for measuring objects having dimensions in the sub-millimeter range. The frequency comb light having the centroid wavelength Lamba_S of 840 nm and a coherence length of smaller than 20 µm, which goes into the monomode fiber 7.1 from a frequency comb laser 101 with annular microresonator, emanates from the end of the monomode fiber 7.1 after passing same and forms a spherical wave after having emanated therefrom. The delay length Y1 between two consecutive pulses in air is 100 µm. A downstream focusing system 82 images the end of the monomode fiber 7.1 in the focusing point F82. The spherical wave focused in the focusing point F82 reaches the beam splitter 3 of a Linnik interferometer, where a reference bundle is formed. This reference bundle reaches a scannable mirror lens 41, the focal point of which at least approximately collides with the focal point F82 and which thus collimates the bundle, which subsequently passes the beam splitter 3 again toward an afocal transfer stage 85 and a camera 6, where it forms the reference bundle in a hologram after passage through the transfer stage. The light, which is reflected at the beam splitter 3 and is collimated by means of a high-aperture microscope lens 801, forms the object bundle, which forms many spherical waves at the light-diffusing object points of the object 55.

The microscopically small object 55 has an extension in the sub-millimeter range and, with a plurality of its object points, is located in the immediate or close vicinity of the focal plane of the microscope lens 801. After passing the beam splitter 3, the spherical waves thus forming are detected again by the microscope lens 801, are collimated, and reach the camera 6 via the beam splitter 3 in transmission via the afocal transfer stage 85, where these spherical waves generate the hologram together with the reference bundle. The distance of the planes in the object space in air, which due to the small coherence length contribute to the hologram, is Y1/=50 µm here. The mirror lens 41 is shifted in a fraction of the delay length Y1 between two consecutive pulses by means of a scanner not illustrated here in order to scan the object 55 holographically in depth. Moreover, in each setting position, 3 steps of one eighth of the centroid wavelength Lambda_S are performed by means of a piezo-actuator not illustrated here, and a hologram is captured in each setting position in order to be able to apply the phase-shift method in the known manner. From the thus obtained hologram stack, the image of the microscopically small object 55, here the intensity, is numerically reconstructed by means of digital computing technology in a manner well known to the skilled person. Thus, the image information is numerically provided layer by layer and put together to form an overall image of the object 55.

Figure 7:
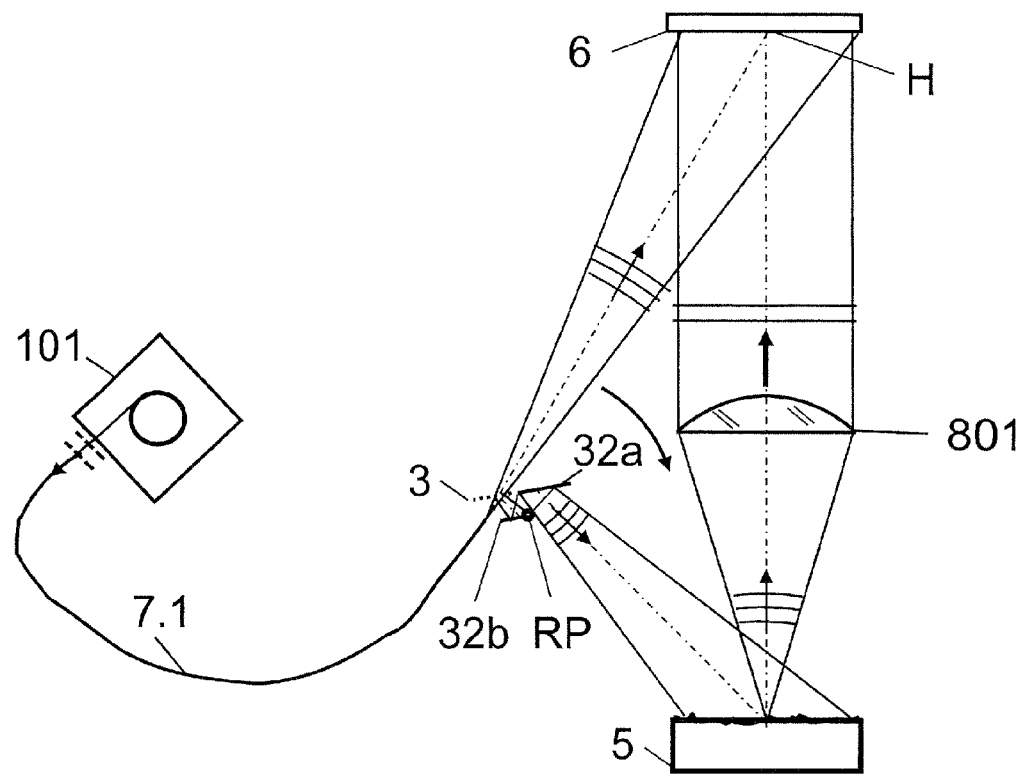
FIG. 7 shows a very simple holographic arrangement for measuring objects having dimensions in the one-digit or two-digit millimeter range.
Figure 7:
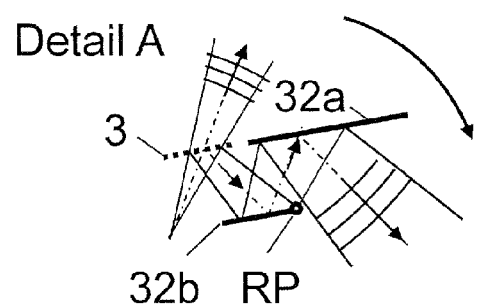
Figure 7:
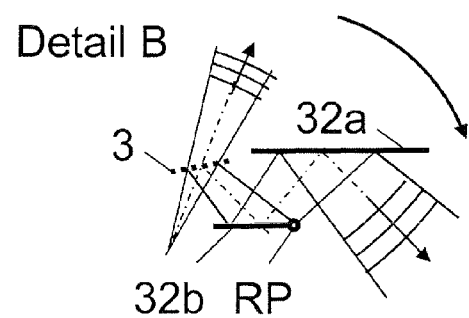

FIG. 7 shows a very simple holographic arrangement for measuring objects having dimensions in the one-digit or two-digit millimeter range. The frequency comb light having the centroid wavelength Lamba_S of 840 nm and a coherence length of smaller than 100 µm, which goes into the monomode fiber 7.1 from a frequency comb laser 101 with annular microresonator, emanates from the end of the monomode fiber 7.1 after passing same and forms a spherical wave after having emanated therefrom. The delay length Y1 between two consecutive pulses in air is 400 µm. The light reaches a beam splitter 3. The light transmitted there reaches the camera 6 as reference light for hologram formation. The light reflected at the beam splitter 3 reaches the object 5 as an object bundle with the rotation point RP via rotatable mirror steps, consisting of the plane mirrors 32a and 32b, said object being located at least approximately in the focal plane of a microscope lens 801.

The spherical waves forming at the object 5 by light diffusion are detected by the microscope lens 801 and form the hologram H with the reference light in the rear focal plane of the microscope lens 801, where the camera 6 is arranged. In detail A and detail B, the rotatable mirror steps, consisting of the plane mirrors 32a and 32b, are illustrated in two different rotating positions, which each correspond to a different optical path difference. By use of the mirror steps, the deflection angle for the object remains unchanged despite rotation.

In another embodiment, the rotatable mirror steps are arranged in the reference optical path. By means of the rotatable mirror steps, the optical path difference is varied by at least one delay length Y1 in the measuring process. The optical path difference for phase setting is set at least three times by means of a piezo-actuator—not illustrated here—assigned to the plane mirror 32a, in steps of at least one eighth of the centroid wavelength in each rotating position of the mirror steps, wherein one hologram is captured each. In this way, a set of 4 holograms with different phases is generated for phase evaluation to be able to apply the phase shift technology in the known manner. From the hologram stack thus generated in the measuring process, the image of the object 5 is reconstructed numerically by means of digital computing technology in the manner well known to the skilled person by providing the image information numerically layer by layer and putting them together to form an overall image of the object 5.

Another embodiment on the basis of the arrangement of FIG. 7 dispenses completely with the phase setting at the plane mirror 32a and reconstructs numerically the intensity distribution in an image or image point from only one single hologram recorded by means of a camera 6, which results as an offline hologram on the camera 6 due to the inclined reference wavefront. Thus, if a camera 6 with a high frame rate is used, also changes over time at an object 5 with a high temporal resolution can be detected by numerical reconstruction of a hologram stack, which in an extreme case can be composed of only two holograms that are recorded one after the other.

Figure 8:
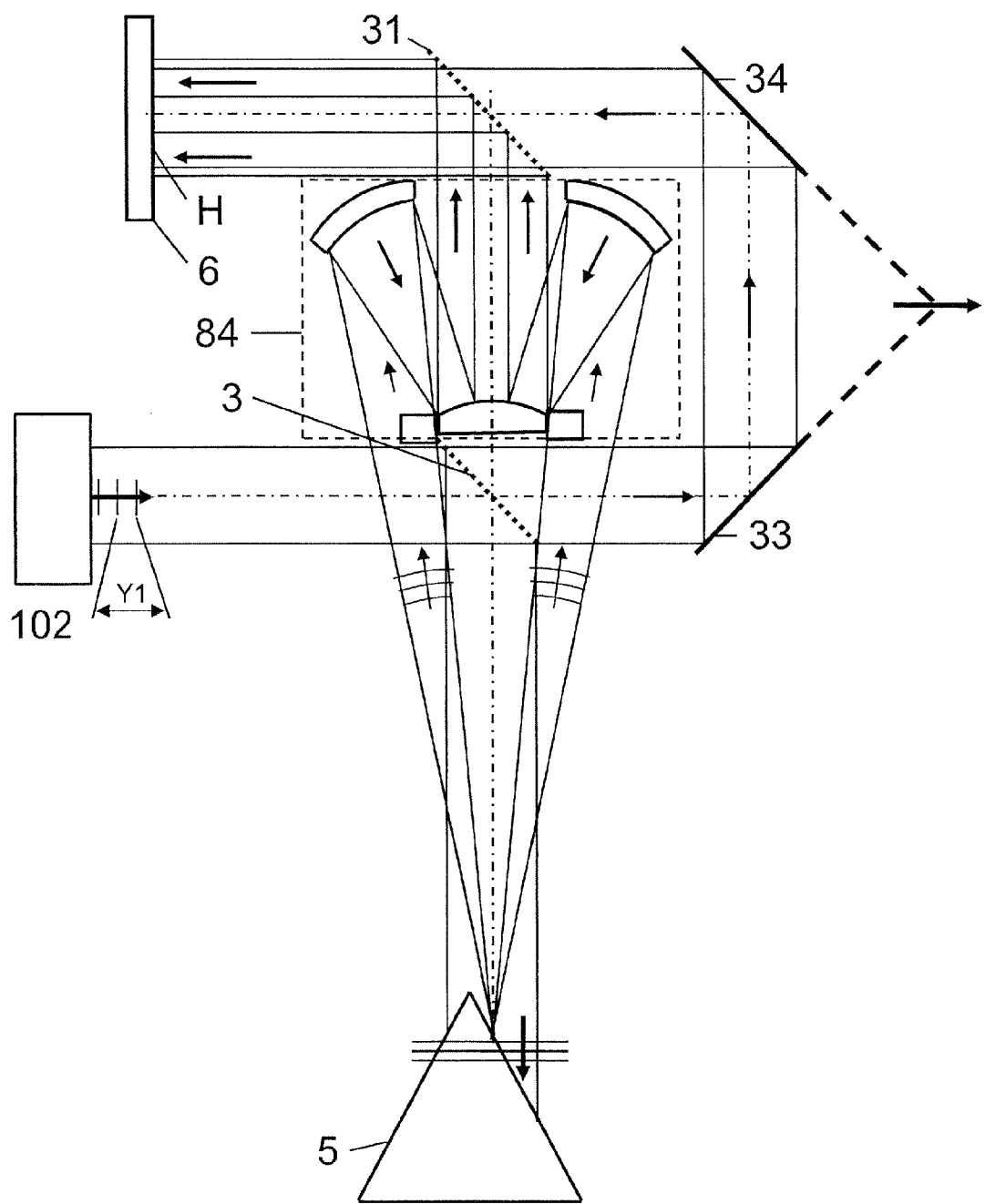
FIG. 8 illustrates a holographic arrangement for measuring objects with a Schwarzschild lens, which as a mirror lens is dispersionless, whereby dispersion effects can be minimized overall in the holographic arrangement.

FIG. 8 illustrates a holographic arrangement for measuring objects with a Schwarzschild lens 84, which as a mirror lens is dispersioniess, whereby dispersion effects can be minimized overall in the holographic arrangement. This also concerns the detection of an object 5 having dimensions in the one-digit millimeter range. The light coming from a frequency comb laser 102, which has a frequency comb characteristic with a delay length of the short pulses Y1 of 500 µm and a coherence length of less than 30 µm, reaches a beam splitter 3, where the reference bundle forms in transmission and reaches the camera 6 via the roof prism arrangement, composed of the plane mirrors 33 and 34, and via the coupling-in beam splitter 31 in transmission. By being shifted in the illustrated direction, the roof prism arrangement with the plane mirrors 33 and 34 serves to create the change of the optical path difference in the holographic arrangement in the order of magnitude of the delay length Y1.

The bundle reflected at the beam splitter 3 reaches the object 5, which is at least approximately located in the focal plane of a Schwarzschild lens 84. The spherical waves forming at the object 5 by light scattering are detected by the Schwarzschild lens 84 and form the hologram H on the camera 6 after passing the beam splitter 3 in reflection with the reference light. A piezo-actuator not illustrated here, which is assigned to the plane mirror 34, supports the required phase setting, so that a hologram stack is generated in the way already described, which is used for the numerical reconstruction of the intensity of the image. In this way, the image information is provided numerically layer by layer and put together for form an overall image of the object 5.

Figure 9:
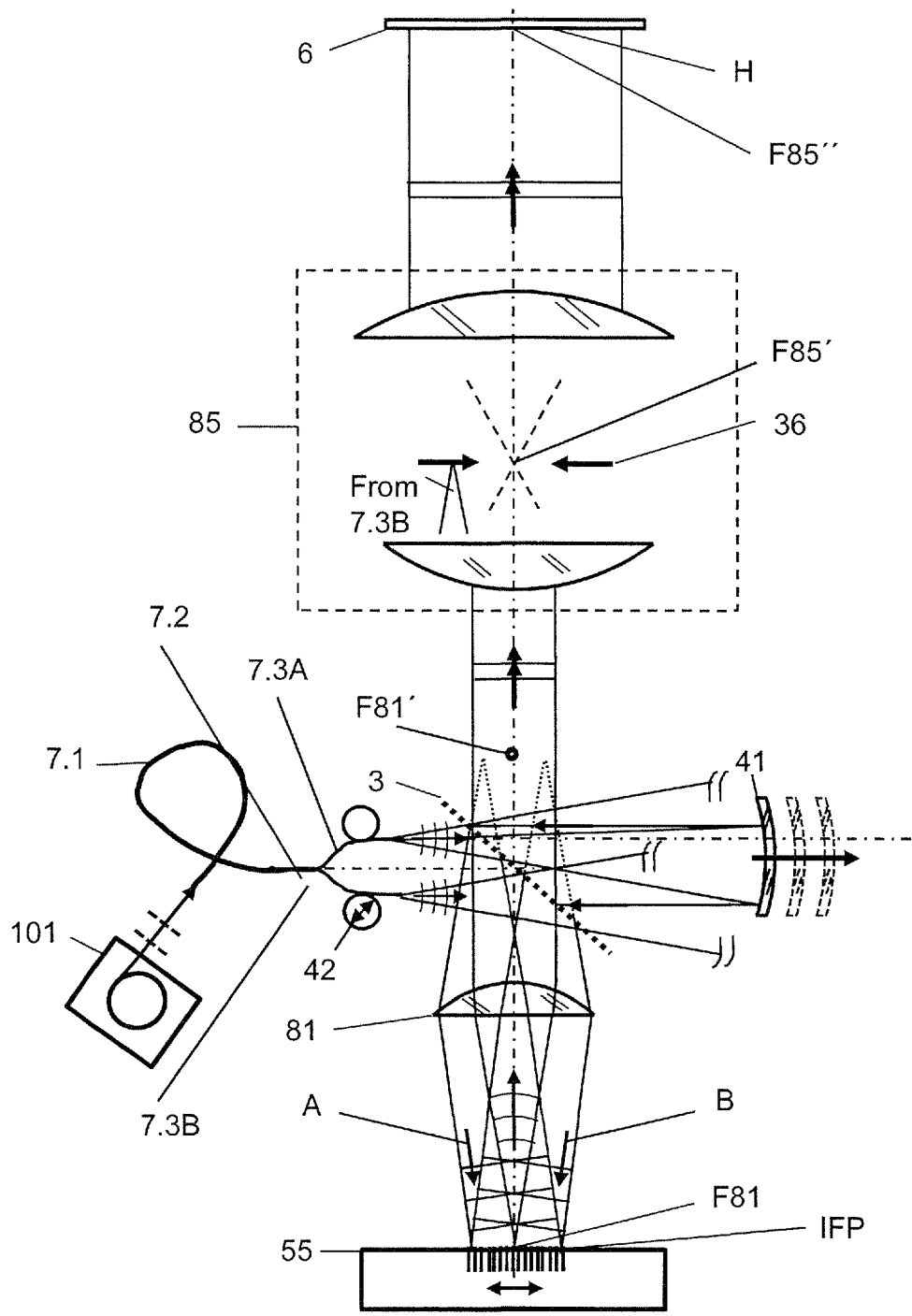
FIG. 9 illustrates the holographic arrangement in a Linnik configuration for measuring objects with a particularly high lateral resolution.

FIG. 9 illustrates the holographic arrangement in a Linnik configuration for measuring objects with a particularly high lateral resolution. The frequency comb light having the centroid wavelength Lamba_S of 840 nm and a coherence length of smaller than 20 µm, which goes into the monomode fiber 7.1 from a frequency comb laser 101 with annular microresonator, passes a Y coupler 7.2 and comes into the monomode fiber 7.3A. The spherical wave emanating at the end of the monomode fiber 7.3A passes the beam splitter 3 partially in transmission and reaches the mirror lens 41, where an at least approximately plane wave or a wave with a large radius of curvature is formed from the spherical wave, which now passes the beam splitter 3 in reflection toward an afocal transfer stage 85 with the aperture 36, where it represents the reference wave for the hologram H on the downstream camera 6.

The light from the monomode fiber 7.3A, which is reflected at the beam splitter 3, reaches the object 55 as a plane wave A via the microscope lens 81. The frequency comb light coupled into the monomode fiber 7.3B is subjected to reflection at the beam splitter 3 and also reaches the object 55 as a plane wave B via the microscope lens 81, with a spatial high-frequency interference fringe pattern IFP being formed at said object. The object 5 is at least approximately located in the focal plane of the microscope lens 81. The interference fringe pattern IFP can be changed in phase by at least 360° by a stretcher 42 in a predefined manner.

The spherical waves forming at the object 55 are detected by the microscope lens 81, reach the camera 6 via the afocal imaging stage 85, where a hologram H is formed with the reference light. A scan is performed at the mirror lens 41, which can vary the optical path difference by at least the order of magnitude of the delay length Y1. A piezo-actuator, not illustrated here, at the mirror lens 41 further allows a phase setting in the magnitude of 90° steps in order to be able to employ the phase shift technology. The light from the monomode fiber 7.3B is not admitted as reference light by the shading effect of the aperture 36, so that only one single reference wave exists in the arrangement, which comes from monomode fiber 7.3A and is collimated via the mirror lens 41.

To increase the lateral resolution in the detection of the object 55, hologram stacks are captured in several phasings of the interference fringe pattern IFP and assist the skilled person in a well-known manner in the numerical reconstruction of the image of the object 55, here the intensity, by means of digital computing technology. In this way, the image information is provided numerically layer by layer and put together to form an overall image of the object 5.

The invention will be described exemplarily with reference to FIGS. 10 to 14. Here, the term light is particularly used as a synonym for electromagnetic radiation from the terahertz, via infrared through to the deep UV spectrum.

FIG. 10 relates to the detection of space debris by means of a holographic arrangement. To this end, a dual frequency comb measuring system—not illustrated here—with time basis for determining the distance and the velocity of the object 51 to be measured is arranged, which hands over the information about the distance and velocity to the measuring system in measurement real time by means of an interface not illustrated here.

Moreover, a frequency comb laser 1c having suitable means to generate frequency comb light with the frequency interval delta_f11=c/2L1 is arranged, where 2L1 represents the delay length at the time t1, which is to be 1200 mm, whereby a spatial pulse interval of Y1=200 mm results. The coherence length lc is at least approximately 1200 µm. The spatially highly coherent bundle of light, which emanates from the frequency comb laser 1b and which is to have plane wavefronts here, is expanded by a mirror expansion optical system, not illustrated here, and is incident on the beam splitter 3 of a Michelson interferometer, wherein a reference bundle and an object bundle are formed. The portion of the incident bundle of light reflected at the beam splitter 3 is reflected in the reference arm R by a mirror 4. A portion of the bundle of light passes the beam splitter 3 toward the rasterized detector 6. The bundle passing the beam splitter 3 is incident on the object 51, which in space is to represent moving space debris with a maximal lateral extension of 2 m. A spherical wave Kk forms at the object point OP_k of the object 51, which also propagates toward the interferometer with a portion of its wavefront.

After collection and reflection by means of a large mirror detection optical system 100 and wave shaping not illustrated here, a portion of the object spherical wave Kk passes the beam splitter 3 by reflection toward the rasterized detector. The diameter of the focusing main mirror in the large mirror detection optical system 100 is 2 m and the focal length thereof is 10 m. A Fourier hologram H1 forms from the object point OP on the rasterized detector 6 at the time t1. Due to the comparatively small coherence length lc of about 1200 μm, only a small portion of the object points of the extended object 51 forms Fourier holograms on the rasterized detector 6, namely those in the region B1, which here corresponds to half the coherence length lc of the light used. A Fourier hologram H1 is detected in the period delta_t_Hol1, which includes the time t1.

The cavity 1d of the frequency comb light 1c is scanned permanently on the basis of the information about the distance and velocity of the moving object, which are provided in measurement real time. The optical delay length of 2L11 at the time t1 has changed to 2L12 at the time t2. The spatial pulse intervals Y11 and Y12 result from 2L11 and 2L12, respectively. The ordinal number q is always kept constant by a setting and control system not illustrated here. Since the object 51 is 10 km away at the time t1, i.e. l_opt_1=10 km to the object 51, the ordinal number q with q=l_opt_1/Y11 and Y11=1.2 m is clearly above 8000. A short scan is performed between the times t1 and t2 in order to be able to sample another part of the object 51 in another sectional plane E2 or shape recognition of the same. A Fourier hologram H2 is detected in a time interval delta_t_Hol2, which includes the time t2.

By an additionally performed "steps scan" after each individual hologram capture and before the next one, i.e. a short scan in the period delta_t_KS, i.e. nested in a long scan in terms of time, the sectional plane E on the moved object is finely shifted in depth, here in the one-digit millimeter range, to scan the movement of the object additionally in its object depth in order to obtain the shape thereof by multiple optical sectioning.

After a third hologram H3 has been captured, in a time interval delta_t_Hol3, which includes the time t3, the cavity 1d is reset in the period delta t_R, so that a new hologram 114 can be captured at the time t4. The ordinal number q is reduced by the approach of the object 51 occurred in the meantime, reduced by the value 16 with respect to the time t1 here. Thus, between t1 and t4, the object 51 has approached the holographic measuring device by 16 delay lengths Y11 (i.e. spatial pulse intervals).

The cavity 1d of the frequency comb laser 1c is controlled on the basis of the extremely precise information in measurement real time over distance and velocity of the object 51 in a control system. In a sufficiently small capturing time delta_t_Hol and a highly dynamically functioning control system for the cavity 1d, the holograms on the rasterized detector 6 can thus—at least in the period during their detection—be considered as "frozen". This means that the phase in the hologram at least in sub-areas thereof changes by less than 2 Pi, and thus the hologram can be evaluated digitally.

However, even in the case of best control performance, the phase in the hologram can only be kept constant for one single ordinal number. As the spatial pulse interval Y1 changes constantly due to the change of the cavity (L1), the phases of other sectional planes, e.g. the sectional plane E_q−1 or E_q+1 belonging to the ordinal number q−1 or q+1, must shift slightly as well upon changing the optical path length of the cavity. By an appropriately long hologram capturing time delta_t_Hol, all sectional planes—except the one belonging to q—can be made "invisible" in the detected hologram by time averaging, since the phase change in the time interval of the detection can be clearly above 2 Pi in all other sectional planes. However, with a very short hologram capturing time delta_t_Hol or with a short exposure—here with a duration in the one-digit microsecond range or in the sub-millisecond range—it might be possible to detect several sectional planes at the same time, so that optional multi-sectioning can be performed as well.

The mirror 4a is assigned an extremely fast scanner, not illustrated here, in order to be able to readjust the optical path difference in the holographic interferometer in a highly dynamic manner if this is not possible by means of the cavity 1d in a way precise or fast enough. This offers the possibility of an additional intervention in the holographic measuring device to keep the phase in the hologram during the hologram detection time delta_t_Hol by means of the rasterized detector 6 sufficiently constant or change it in a desired way.

The computer-based control system for the highly complex and highly dynamic control of the frequency comb laser 1c with the cavity 1d and the control systems for synchronization of the capture of holograms by means of the rasterized detector 6 are not illustrated here.

The digital reconstruction of these recorded holograms poses a demanding task for the skilled person, but it can well be solved with knowledge of hologram reconstruction algorithmics and knowledge of computing technology.

The holographic arrangement of FIG. 10 can be used for objects 51 having the following features: distance of the object 51: 10 km, relative velocity v thereof with component in the direction of the measuring light: 100 m per second, lateral object extension: 2 m. In the rasterized detector 6, the image integration time in the embodiment is in the one-digit millisecond range if the control is sufficiently good. In this embodiment, the scan frequency of the cavity 1d is several Hertz up to a few 10 Hz, so that it is "rest" several times per second (yoyo effect).

FIG. 11 illustrates the relations for the delay lengths (spatial pulse intervals) Y1j with respect to time. The situation is presented for the ordinal number q and for the ordinal number q−16 for two long scans with the period delta_t_LS each. In a long scan with the period delta_t_LS, several short scans with a period delta_t_KS are performed, which are solely dedicated to depth scanning of the object 51 for shape detection. The capturing time for a hologram by means of the rasterized detector 6 is delta_t_Hol.

FIG. 12 relates to the detection of a light-diffusing object 52 made of a metallic material by means of a holographic arrangement. The task is to perform a measurement of the shape deviation. It is known that the object 52 does not exhibit any significant deviation from the target geometry.

The pulsed light reaching a Y-splitter 7.2 from the frequency comb laser 1c via a fiber 7.1 passes the fibers 7-R and 7-O. The spatially highly coherent bundle of light emanating from the fiber 7-R reaches the rasterized detector 6 as a reference bundle.

The spatially highly coherent object bundle of light emanating from the fiber 7-O reaches the object 52, where it is scattered back, via an off-axis mirror 8, which slightly focuses the light at the point of a small breakthrough of an off-axis mirror 10, whereby it notably increases in bundle cross-section in the further course.

In a further embodiment not illustrated by a figure here, the maximal lateral extension of the breakthrough in the off-axis mirror 10 is about 40% of the lateral extension of the off-axis mirror 10, which has a maximal lateral extension of 120 mm. The comparatively large breakthrough is required to generate a well collimated bundle of light for sampling the object 52 at a larger distance.

The light returning from the object 52 is focused by the off axis mirror 10 and is incident on the rasterized detector 6, where it forms a Fourier hologram with the reference bundle, which is detected. The optical arrangement illustrated in FIG. 12 can also constitute the basis for the detailed formation of the optical arrangement according to FIG. 10.

The digital reconstruction of these recorded holograms poses a demanding task for the skilled person, but it can well be solved with knowledge of hologram reconstruction algorithmics and knowledge of computing technology.

FIG. 13 shows the mechanical vibration of the object 52 in form of the vibration path s, and FIG. 14 shows the optical path length Y1j for compensating for this vibration over time, which is generated by control using the information about the respective current deflection of the object 52 in measurement real time. The hologram is captured in the period delta_t_Hol. The short scan for depth scanning the object 52 is performed in the period delta_t_KS. The period delta_tR serves to reset the cavity to its initial position.

LIST OF REFERENCE NUMERALS

1*a*, 1*b* frequency comb laser
1.1 first frequency comb laser
1.2 second frequency comb laser
10 off-axis mirror
100 large mirror detection optical system
101, 102 frequency comb laser
3, 31 beam splitter
4, 41 mirror
F4 focal point
5, 51, 55 object
6 detector (camera)
7.1 fiber
7.3A, 7.3B fiber
7-R, 7-O fiber
7.2 Y-coupler
8 off-axis mirror
81 collimator (microscope lens)
82 focusing system
F82 focusing point
84 Schwarzschild lens
85 afocal transfer stage (afocal imaging stage)
801 microscope lens
H, H1, H2, H3, H4 hologram

The invention claimed is:

1. A method for short-coherence holography of an at least partially light-diffusing object:

providing a holographic measuring arrangement comprising:

at least one frequency comb light source (1*a*, 1*b*, 1*c*, 1.1, 1.2) of a short coherent or quasi short-coherent light with a comparatively small coherence length with respect to an object extension and with controllable frequency comb light by predetermined change of an optical path length L1 in its integrated cavity or in at least one cavity (1*d*) assigned to the at least one frequency comb light source, an unbalanced two-beam interferometer with a reference arm (R) and an object arm (O), which applies measuring light from the at least one frequency comb light source to an object, with a detection channel for measuring light that returns, at least one rasterized detector (6) for capturing holograms and with a computer or computer system for the highly dynamic control of the at least one frequency comb light source and synchronization of the hologram capture with respect to the at least one frequency comb light source and algorithms for numerical hologram reconstruction, means for at least approximately determining a distance and a velocity of the object to be measured and an interface for data transfer;

generating a reference bundle of rays and an object bundle of rays using the unbalanced two-beam interferometer, in which a mean optical path difference Xm different from zero exists, and which, at its output, has a surface-like hologram detection area HDB, in which the at least one rasterized detector spectrally integrally detecting at least in spectral subranges is arranged, and which in its surface-like hologram detection area HDB at a point DP of the HDB, for an optically detected object point OP, always has an optical object point-related path difference x_OP_DP different from zero, wherein in the unbalanced two-beam interferometer, short-coherent or quasi short-coherent light having frequency comb characteristic with the frequency interval $\Delta f1 = c/Y1$ in the frequency space is used for hologram formation, wherein Y1 represents the delay length of the delay line in the frequency comb generation, and at least one short-coherence hologram is detected in the capturing process by the at least one rasterized detector, and in which the inequation $$|(x\_OP\_DP - n1 \cdot Y1)| < lc$$

is satisfied for at least one integer n1 with n1=1, 2, 3, . . . , and for at least one optically detected, at least partially light-diffusing object point OP - and thus the at least one short-coherence hologram forms in at least one subrange of the at least one rasterized detector - with lc as the coherence length of the short-coherent or quasi short-coherent comb light, which returns from the light-diffusing object point OP and contributes to hologram formation, and with x_OP_DP as the optical path difference at a point DP of the surface-like hologram detection area HDB for the optically detected, light-diffusing object point OP;

performing at least one measurement for determining the distance and the velocity - or a multiple measurement of the distance, also by means of a conducted time measurement suitable for determination of the velocity of the object (51, 52) to be measured, which with at least one component of its movement also moves in the propagation direction of the measuring light, and the magnitude of the distance and the velocity is available as information in measurement real time at least approximately, and is provided for the measurement method for shape detection by means of optical sectioning, and in the holographic sampling process, the spatial pulse interval Y1 of the emitted short pulses of a pulse train of the frequency comb light source is changed by a predetermined change of the optical path length (L1) of at least one integrated cavity (1d) or a cavity (1d) assigned to the frequency comb light source which influences the short coherent or quasi short-coherent light in its frequency comb interval, on the basis of the information about the velocity and distance of the object (51,52), which is provided in real time, and the optical path length of this cavity (1d) is changed in form of a long scan—either increased or decreased, so that the ordinal number q of object-sampling short pulses is kept constant for at least the capturing time delta_t_Hol of the at least one short-coherence hologram, by making the first derivative over time of the spatial pulse interval, which results from the delay length of the frequency comb-forming cavity, at least approximately equal to a value of 2/q-times the component of the velocity of the object in the movement direction or the difference velocity between the at least one rasterized detector and the object, wherein the ordinal number q results from the quotient of optical path length 1_opt, from the position of optical path difference zero at the unbalanced two-beam interferometer in the object optical path to a sampled object point OP, and the spatial pulse interval Y1, so that the phase in the at least one short-coherence hologram changes by less than 2 Pi at least in a sub-range thereof; and capturing the at least one short-coherence hologram using the at least one rasterized detector and performing a numerical reconstruction thereof, whereby at least one sectional plane E or one sectional area is calculated and at least one intensity amplitude of a light-diffusing object point OP from the reconstructed hologram above a threshold value 1S is evaluated as a characteristic of the presence of a light-diffusing object point OP of the object space.

2. The method according to claim 1, wherein a plurality of holograms j, in form of a hologram stack, is formed gradually in j situations and is captured by means of a rasterized detector (6), and wherein in the capturing process or between the capture of individual short- coherence holograms j, a gradual change of the mean optical path difference Xm in the holographic interferometer in the reference arm and/or in the object arm, and/or the delay length Y1 of the delay line for frequency comb generation is performed until for at least one light-diffusing object point OP_k of the object space in an area at the point DP in the hologram detection area HDB for frequency light, which originates at a light source with the optical delay length Y1, at least one of the two inequations (1) and (2) is satisfied for at least one integer n1 with n1=1, 2, 3, . . .

$$|(x\_OP\_k\_j\_DP\_j - n1 \cdot Y1)| < 1c \quad (1)$$

$$|(x\_OP\_K\_DP - n1 \cdot Y1\_j)| < 1c \quad (2)$$

and thus at least one hologram is formed, wherein the first inequation (1) describes the case of changing the mean optical path difference Xm in the holographic interferometer and the second inequation (2) describes the case of changing the delay length Y1 of the delay line for frequency comb generation in the holographic interferometer, with 1c as the coherence length of the hologram-forming frequency comb light, which returns from at least one light-diffusing object point OP_k, and x_OP_k_j DP_j or x_OP_k_DP as the optical path difference at a point DP of the surface-like hologram detection area HDB for an optically detected object point OP_k and for a situation j, and Y1 or Y1_j as the respective delay length Y1 of the delay line of the frequency comb light source (1a, 1b), and the captured short-coherence holograms with the number j are reconstructed digitally, and at least one intensity amplitude of a light-diffusing object point OP_k from at least one reconstructed hologram j above a threshold value 1S is evaluated as a characteristic of the presence of a light-diffusing object point OP_k of the object space, so that by means of digital hologram reconstruction and using the threshold criterion 1S, a plurality of spatially distributed light-diffusing object points OP_k, with k=2, 3, 4, . . . in the object space and thus a 3D point cloud can be determined.

3. The method according to claim 1, wherein a generation and detection of holograms with the number j1 is performed in a first phase for an addressed object depth range of the object space with light-diffusing object points OP_k for a first short-coherent or quasi short-coherent light having frequency comb characteristic with the frequency interval $\Delta f1 = c/Y1$ for an integer n1, with n1=1, 2, 3, . . . in a time domain $\Delta t1$, and, in the capturing process or between the capture of individual short-coherence holograms, a gradual change of the mean optical path difference Xm in the holographic interferometer in the reference arm and/or
in the object arm is performed, followed by switching off, deflecting, or blocking out the first light having frequency comb characteristic, and a generation and detection of holograms with the number j2 is performed in a second phase in a time domain $\Delta t2$ for the same object depth range of the object space with the same light-diffusing object points OPj for a second short-coherent or quasi short-coherent light having frequency comb characteristic with the frequency 30 interval $\Delta f2 = c1/2$, and, in the capturing process or between the capture of individual short-coherence holograms, a gradual change of the mean optical path difference Xm in the holographic interferometer in the reference arm
or/and in the object arm
is performed in the same way as in the time domain $\Delta t1$.

4. The method according to claim 1, wherein a generation and detection of holograms with the number j1 is performed for an addressed object depth range of the object space with light-diffusing object points OP_k for a first short-coherent or quasi short-coherent light having frequency comb characteristic with the frequency interval $\Delta f1 = c/Y1$ in a spectral range delta_sigmal, and, in the capturing process or between the capture of individual short-coherence holograms, a gradual change of the mean optical path difference Xm in the holographic interferometer in the reference arm
or/and in the object arm
is performed, and, at the same time, a generation and detection of holograms with the number j2 is performed for at least one second short-coherent or quasi short-coherent light having frequency comb characteristic with the frequency interval Δf2=c/Y2 in a spectral range delta_sigma2, which is completely separate from the spectral range delta_sigma1, for the same object depth range of the object space with the same light-diffusing object points OP_k.

5. The method according to claim 1, wherein the Fourier holography is applied.

6. The method according to claim 1, wherein the in-line holography is applied.

7. The method according to claim 1, wherein the holography with phase shift technology is applied.

8. The method according to claim 1, wherein the spatial pulse interval Y1 is made small to the waveoptical depth of field in the detection channel of the holographic measuring arrangement.

9. The method according to claim 1, wherein the capturing period delta_t_Hol for a hologram is not substantially exceed the movement period delta_t-depth for passing the waveoptical field of depth D of the holographic detection by the moving object (51, 52), wherein the waveoptical field of depth D is predetermined by the effective numerical aperture and the centroid wavelength of the detecting radiation.

10. The method according to claim 1, wherein at least two frequency comb light sources, each with a variable optical length of the cavity (id), are employed, of which only one determines the respective current spatial pulse interval at a time, and respectively one short-pulse frequency comb light source with the active variable cavity samples the object (51, 52) optically in at least one sectional plane E or a weakly curved surface, so that the object (51, 52) is at least partially holographically detected alternately, but always by one of the two frequency comb light sources and the rasterized detector (6), and thus at least two holograms are captured sequentially.

11. The method according to claim 1, wherein at least one short scan is performed for varying the optical length of the frequency comb-generating cavity (1d), whereby an at least approximately step-like course of the optical path length of the cavity (1d) over time results.

12. The method according to claim 1, wherein a scan of the reference mirror (4a) can be performed between one or several hologram captures.

13. The method according to claim 1, wherein at least part of the hologram formed by means of the object (51, 52) is supplied to high-speed photodetectors measuring point by point.

14. The method according to claim 1, wherein high-speed capturing of the holograms formed by means of an object (51, 52) is performed.

15. A device for short-coherence holography of an at least partially light-diffusing object comprising:
at least frequency comb light source (1a, 1b, 1c, 1.1, 1.2) of a short coherent or quasi short-coherent light with a comparatively small coherence length with respect to an object extension and with controllable frequency comb light by predetermined change of an optical path length L1 in its integrated cavity or in at least one cavity (1d) assigned to the at least one frequency comb light source—light being understood to be electromagnetic radiation from terahertz, via IR, VIS through to UV and EUV radiation;
an unbalanced two-beam interferometer with a reference arm (R) and an object arm (O), which applies measuring light from the at least one frequency comb light source to an object, with a detection channel for measuring light that returns;
at least one rasterized detector (6) for capturing holograms and with a computer or computer system for the highly dynamic control of the at least one frequency comb light source and synchronization of the hologram capture with respect to the at least one frequency comb light source and algorithms for numerical hologram reconstruction;
means for at least approximately determining a distance and a velocity of the object to be measured and an interface for data transfer; and
the unbalanced two-beam interferometer generates a reference bundle of rays and an object bundle of rays,
in which a mean optical path difference Xm different from zero exists, and
which, at its output, has a surface-like hologram detection area HDB, in which the at least one rasterized detector spectrally integrally detecting at least in spectral sub-ranges is arranged, and
which in its surface-like hologram detection area HDB at a point DP of the HDB, for an optically detected object point DP, always has an optical object point-related path difference x_OP_DP that is clearly different from zero,
wherein the short-coherent or quasi short-coherent light having frequency comb characteristic is formed and assigned to the unbalanced two-beam interferometer,
at least one measurement is performed for determining the distance and the velocity—or a multiple measurement of the distance also by means of a conducted time measurement suitable for determination of the velocity of the object (51, 52) to be measured, which with at least one component of its movement also moves in the propagation direction of the measuring light,
and the magnitude of the distance and the velocity is available as information in measurement real time at least approximately, and is provided for the measurement method for shape detection by means of optical sectioning,
and in the holographic sampling process, the spatial pulse interval Y1 of the emitted short pulses of a pulse train of the frequency comb light source is changed by a predetermined change of the optical path length (L1) of at least one integrated cavity (1d) or a cavity (1d) assigned to the frequency comb light source, which influences the short coherent or quasi short-coherent light in its frequency comb interval,
on the basis of the information about the velocity and distance of the object (51,52), which is provided in real time, and
the optical path length of this cavity (1d) is changed in form of a long scan—either increased or decreased,
so that the ordinal number q of object-sampling short pulses is kept constant for at least the capturing time delta_t_Hol of at least one short-coherence hologram,
by making the first derivative over time of the spatial pulse interval, which results from the delay length of the frequency comb-forming cavity, at least approximately equal to a value of 2/q-times the component of the velocity of the object in the movement direction or the difference velocity between the at least one rasterized detector and the object, wherein the ordinal number q results from the quotient of optical path length 1_opt, from the position of optical path difference zero at the unbalanced two-beam interferometer in the object optical path to a sampled object point OP, and the spatial pulse interval Y1,
so that the phase in the at least one short-coherence hologram changes by less than 2 Pi at least in a sub-range thereof, and the at least one short-coherence hologram is captured using the at least one rasterized detector and a numerical reconstruction thereof is performed, whereby at least one sectional plane E or one sectional area is calculated.

16. The device according to claim 15, wherein the the short-coherent or quasi short-coherent light having frequency comb characteristic is formed as the at least one single frequency comb laser (1a, 1b) with a delay length Y1.

17. The device according to claim 15, wherein means for changing the delay length Y1 of the at least one frequency comb light source (1a, 1b) are arranged.

18. The device according to claim 15, wherein means for changing the mean optical path difference Xm of the unbalanced two-beam interferometer are arranged.

19. The device according to claim 15, wherein the holographic interferometer is formed as a Michelson interferometer.

20. The device according to claim 19, wherein a spherical mirror (41) or a paraboloid of revolution mirror (4) with its focal plane in the reference ray space is arranged in the reference arm of the Michelson interferometer.

21. The device according to claim 20, wherein means for laterally shifting the spherical mirror (41) or the paraboloid of revolution mirror (4) are arranged.

22. The device according to claim 19, wherein a spherical mirror or an off-axis paraboloid of revolution mirror with a miniaturized end mirror is arranged in the reference arm of the Michelson interferometer, which is arranged at least approximately in the focus of the mirror.

23. The device according to claim 22, wherein the miniaturized end mirror is assigned means for a highly dynamic phase shift.

24. The device according to claim 15, wherein the holographic interferometer is formed as an interferometer with a location for beam splitting and a location for beam convergence, these locations being spatially completely separate from each other.

25. The device according to claim 24, wherein the holographic interferometer is formed with a U arrangement in the reference optical path and a V arrangement in the object optical path.

26. The device according to claim 25, wherein an end reflector with lateral shear and in an at least partially retro-reflective manner is arranged in the reference optical path.

27. The device according to claim 15, wherein an optical system reducing the cross-section of the bundle of rays is assigned to the holographic interferometer for object light in the propagation direction to the detection.

28. The device according to claim 15, wherein the holographic arrangement is formed as an in-line arrangement with an optical system reducing the cross-section of the bundle of rays for object light that returns.

* * * * *